US012689694B2

(12) United States Patent
Takayama et al.

(10) Patent No.: US 12,689,694 B2
(45) Date of Patent: Jul. 21, 2026

(54) INFORMATION PROCESSING DEVICE TO DISPLAY SAMPLE IMAGE AND COMPARATIVE SAMPLE IMAGE OF MODE SPECIFIED BY A USER SIDE BY SIDE

(71) Applicant: PFU LIMITED, Kahoku (JP)

(72) Inventors: Yurika Takayama, Kahoku (JP); Toshihiko Nagae, Kahoku (JP); Hirotaka Furuya, Kahoku (JP)

(73) Assignee: PFU LIMITED, Kahoku (JP)

( * ) Notice: Subject to any disclaimer, the term of this patent is extended or adjusted under 35 U.S.C. 154(b) by 25 days.

(21) Appl. No.: 18/569,479

(22) PCT Filed: Jun. 17, 2021

(86) PCT No.: PCT/JP2021/023105
§ 371 (c)(1),
(2) Date: Dec. 12, 2023

(87) PCT Pub. No.: WO2022/264383
PCT Pub. Date: Dec. 22, 2022

(65) Prior Publication Data
US 2024/0283877 A1 Aug. 22, 2024

(51) Int. Cl.
*H04N 1/00* (2006.01)

(52) U.S. Cl.
CPC ..... *H04N 1/00448* (2013.01); *H04N 1/00482* (2013.01); *H04N 1/00822* (2013.01); *H04N 1/0097* (2013.01); *H04N 2201/0081* (2013.01)

(58) Field of Classification Search
CPC .......... H04N 1/00448; H04N 1/00482; H04N 1/00822; H04N 1/0097; H04N 2201/0081
See application file for complete search history.

(56) References Cited

U.S. PATENT DOCUMENTS

2008/0218776 A1 9/2008 Takami et al.
2009/0021784 A1* 1/2009 Hoshii ............... H04N 1/00363
358/1.15
(Continued)

FOREIGN PATENT DOCUMENTS

JP 2003-10946 A 1/2003
JP 2003-209705 A 7/2003
(Continued)

OTHER PUBLICATIONS

International Search Report dated Sep. 14, 2021 for corresponding PCT Application No. PCT/JP2021/023105 (3 pages) with English Translation (2 pages).
(Continued)

*Primary Examiner* — Nicholas Pachol
(74) *Attorney, Agent, or Firm* — Womble Bond Dickinson (US) LLP

(57) ABSTRACT

Provided is an information processing apparatus to improve usability when a user sets an imaging mode or an image processing mode. An information processing apparatus includes a storage where, for each of a plurality of imaging modes or image processing modes, a comparative imaging mode different from the imaging mode or a comparative image processing mode different from the image processing mode, a sample image being an image of a sample medium imaged with the imaging mode or an image acquired by executing an image processing of the image processing mode on an image of the sample medium, and a comparative sample image being an image of the sample medium imaged with the comparative imaging mode or an image acquired by executing an image processing of the image processing of the comparative image processing mode on the image of the sample medium are stored in advance, a communication device to communicate with an image reading apparatus, a display to display a
(Continued)

sample image and a comparative sample image of an imaging mode or an image processing mode specified by a user side by side, and a setting module to set an imaging mode or an image processing mode set by the user to the image reading apparatus through the communication device.

18 Claims, 17 Drawing Sheets

(56)                    References Cited

U.S. PATENT DOCUMENTS

| | | | | |
|---|---|---|---|---|
| 2009/0129692 | A1* | 5/2009 | Shikata | H04N 23/633 |
| | | | | 382/254 |
| 2009/0322774 | A1* | 12/2009 | Hosoi | H04N 21/4858 |
| | | | | 345/581 |
| 2011/0227939 | A1* | 9/2011 | Inoue | H04N 21/8153 |
| | | | | 345/589 |
| 2012/0026519 | A1* | 2/2012 | Yoshida | H04N 1/6011 |
| | | | | 358/1.11 |
| 2012/0212786 | A1* | 8/2012 | Nishiura | H04N 1/00448 |
| | | | | 358/3.24 |
| 2015/0077780 | A1* | 3/2015 | Harashima | H04N 1/00482 |
| | | | | 358/1.15 |
| 2016/0127645 | A1* | 5/2016 | Sudo | H04N 23/667 |
| | | | | 348/221.1 |
| 2017/0168763 | A1* | 6/2017 | Ohshima | H04N 1/0044 |
| 2020/0051231 | A1* | 2/2020 | Tsukamoto | G06T 7/0002 |
| 2020/0336604 | A1* | 10/2020 | Takashima | H04N 1/00408 |
| 2021/0118115 | A1* | 4/2021 | Tsukamoto | G06T 7/001 |
| 2021/0211549 | A1* | 7/2021 | Takashima | H04N 1/0044 |

FOREIGN PATENT DOCUMENTS

| | | |
|---|---|---|
| JP | 2007-122521 | 5/2007 |
| JP | 2008-219735 A | 9/2008 |
| JP | 2008-271058 A | 11/2008 |
| JP | 2016-92543 A | 5/2016 |
| JP | 2019-88382 A | 6/2019 |

OTHER PUBLICATIONS

Written Opinion dated Sep. 14, 2021 for corresponding PCT Application No. PCT/JP2021/023105 (3 pages) with English Translation (3 pages).
Preliminary Report on Patentability dated Dec. 14, 2023 for corresponding PCT Application No. PCT/JP2021/023105 (4 pages) with English Translation (4 pages).

* cited by examiner

Fig. 4A

| IMAGING MODE | COMPARATIVE IMAGING MODE | SAMPLE IMAGE | COMPARATIVE SAMPLE IMAGE | ... |
|---|---|---|---|---|
| RESOLUTION = 200 dpi GRADATION RANGE = 0 TO 255 | RESOLUTION = 1200 dpi GRADATION RANGE = 0 TO 255 | P011 | P013 | ... |
| RESOLUTION = 300 dpi GRADATION RANGE = 0 TO 255 | RESOLUTION = 1200 dpi GRADATION RANGE = 0 TO 255 | P012 | P013 | ... |
| ... | ... | ... | ... | ... |

Fig. 4B

| IMAGE PROCESSING MODE | COMPARATIVE IMAGE PROCESSING MODE | SAMPLE IMAGE | COMPARATIVE SAMPLE IMAGE | ... |
|---|---|---|---|---|
| BINARY (NORMAL) | COLOR (NORMAL) | P001 | P007 | ... |
| BINARY + GROUND PATTERN ELIMINATION | BINARY (NORMAL) | P002 | P001 | ... |
| BINARY + GROUND TRACKING | BINARY (NORMAL) | P003 | P001 | ... |
| GRAY SCALE (NORMAL) | COLOR (NORMAL) | P004 | P007 | ... |
| GRAY SCALE + CONTOUR EMPHASIS | GRAY SCALE + MOIRE ELIMINATION | P005 | P006 | ... |
| GRAY SCALE + MOIRE ELIMINATION | GRAY SCALE + CONTOUR EMPHASIS | P006 | P005 | ... |
| COLOR (NORMAL) | GRAY SCALE (NORMAL) | P007 | P004 | ... |
| COLOR + CONTRAST-FIRST | COLOR + TINT-FIRST | P008 | P009 | ... |
| COLOR + TINT-FIRST | COLOR + CONTRAST-FIRST | P009 | P008 | ... |
| ... | ... | ... | ... | ... |

Fig. 16

INFORMATION PROCESSING DEVICE TO DISPLAY SAMPLE IMAGE AND COMPARATIVE SAMPLE IMAGE OF MODE SPECIFIED BY A USER SIDE BY SIDE

CROSS-REFERENCE TO RELATED APPLICATION(S)

This application is a U.S. National Phase Patent Application and claims priority to and the benefit of International Application Number PCT/JP2021/023105, filed on Jun. 17, 2021, the entire content of which is incorporated herein by reference.

TECHNICAL FIELD

The present disclosure relates to an information processing apparatus, a control method, and a control program.

BACKGROUND ART

In recent years, image reading apparatuses to image media and generate images, such as a scanner, are used for imaging various types of media for various uses. The image quality required for an image reading apparatus varies with, for example, the purpose of the image or the type of imaging target medium. Generally, in order to be able to generate a suitable image based on a purpose or a medium type, the image reading apparatus has various imaging modes and image processing mode, such as a setting related to resolution, gradation range, color, brightness, hue, chroma, or noise elimination. However, it is not easy for a user to select a suitable imaging mode or image processing mode based on a purpose or a medium type from among various imaging modes and image processing modes.

An image processing apparatus to display a preview image presenting the result of processing selected from various types of processing items executed on image data is disclosed (PTL 1). The image processing apparatus displays input screen information including a content-independent processing items of all processing items settable to image data and sample image data stored in advance, prior to input of the image data. Then, the image processing apparatus displays sample image data where a setting input accepted for the content-independent processing item is applied as a preview image.

A profile editing apparatus to accept input of a profile and generate a pre-edited image acquired by converting an image according to the profile and a post-edited image acquired by converting the same image according to an edited profile acquired by editing the profile is disclosed (PTL 2). The profile editing apparatus displays the pre-edited image and the post-edited image side by side or displays the images alternately.

CITATION LIST

Patent Literature

[PTL 1]
Japanese Unexamined Patent Publication (Kokai) No. 2008-219735
[PTL 2]
Japanese Unexamined Patent Publication (Kokai) No. 2008-10946

SUMMARY OF INVENTION

In order to enable a user to set a more suitable imaging mode or image processing mode, it is preferred that an image reading apparatus improve usability when an imaging mode or an image processing mode is set.

An object of an information processing apparatus, a control method and a control program is to improve usability when a user sets an imaging mode or an image processing mode.

According to some embodiments, an information processing apparatus includes a storage where, for each of a plurality of imaging modes or image processing modes, a comparative imaging mode different from the imaging mode or a comparative image processing mode different from the image processing mode, a sample image being an image of a sample medium imaged with the imaging mode or an image acquired by executing an image processing of the image processing mode on an image of the sample medium, and a comparative sample image being an image of the sample medium imaged with the comparative imaging mode or an image acquired by executing an image processing of the comparative image processing mode on the image of the sample medium are stored in advance, a communication device to communicate with an image reading apparatus, a display to display a sample image and a comparative sample image of an imaging mode or an image processing mode specified by a user side by side, and a setting module to set an imaging mode or an image processing mode set by the user to the image reading apparatus through the communication device.

According to some embodiments, an information processing apparatus includes a storage where, for each of a plurality of imaging modes or an image processing modes, a comparative imaging mode different from the imaging mode or a comparative image processing mode different from the image processing mode, a sample image being an image of a sample medium imaged with the imaging mode or an image acquired by executing an image processing of the image processing mode on an image of the sample medium, and a comparative sample image being an image of the sample medium imaged with the comparative imaging mode or an image acquired by executing an image processing of the comparative image processing mode on the image of the sample medium are stored in advance, an imaging device to generate an input image by imaging a medium, a display to display a sample image and a comparative sample image of an imaging mode or an image processing mode specified by a user side by side, and a control module to control the imaging device with an imaging mode set by the user or execute an image processing of an image processing mode set by the user on the input image.

According to some embodiments, a control method of an information processing apparatus includes storing, for each of a plurality of imaging modes or image processing modes, a comparative imaging mode different from the imaging mode or a comparative image processing mode different from the image processing mode, a sample image being an image of a sample medium imaged with the imaging mode or an image acquired by executing an image processing of the image processing mode on an image of the sample medium, and a comparative sample image being an image of the sample medium imaged with the comparative imaging mode or an image acquired by executing an image processing of the comparative image processing mode on the image of the sample medium in a storage in advance, displaying a sample image and a comparative sample image of an imaging mode or an image processing mode specified by a user side by side on a display, and setting an imaging mode or an image processing mode set by the user to an image reading apparatus through a communication device.

According to some embodiments, a control method of an information processing apparatus includes storing, for each of a plurality of imaging modes or an image processing modes, a comparative imaging mode different from the imaging mode or a comparative image processing mode different from the image processing mode, a sample image being an image of a sample medium imaged with the imaging mode or an image acquired by executing an image processing of the image processing mode on an image of the sample medium, and a comparative sample image being an image of the sample medium imaged with the comparative imaging mode or an image acquired by executing an image processing of the comparative image processing mode on the image of the sample medium in a storage in advance, displaying on a display a sample image and a comparative sample image of an imaging mode or an image processing mode specified by a user side by side, and controlling an imaging device to image a medium with an imaging mode set by the user or executing an image processing of an image processing mode set by the user on an image of the medium.

According to some embodiments, a control program of an information processing apparatus including a storage, a communication device to communicate with an image reading apparatus, and a display, causes the information processing apparatus to execute storing, for each of a plurality of imaging modes or image processing modes, a comparative imaging mode different from the imaging mode or a comparative image processing mode different from the image processing mode, a sample image being an image of a sample medium imaged with the imaging mode or an image acquired by executing an image processing of the image processing mode on an image of the sample medium, and a comparative sample image being an image of the sample medium imaged with the comparative imaging mode or an image acquired by executing an image processing of the comparative image processing on the image of the sample medium in the storage in advance, displaying a sample image and a comparative sample image of an imaging mode or an image processing mode specified by a user side by side on the display, and setting an imaging mode or an image processing mode set by the user to an image reading apparatus through the communication device.

According to some embodiments, a control program of an information processing apparatus including a storage, an imaging device to image a medium, and a display, causes the information processing apparatus to execute, storing, for each of a plurality of imaging modes or image processing modes, a comparative imaging mode different from the imaging mode or a comparative image processing mode different from the image processing mode, a sample image being an image of a sample medium imaged with the imaging mode or an image acquired by executing an image processing of the image processing mode on an image of the sample medium, and a comparative sample image being an image of the sample medium imaged with the comparative imaging mode or an image acquired by executing an image processing of the comparative image processing mode on the image of the sample medium in the storage in advance, displaying a sample image and a comparative sample image of an imaging mode or an image processing mode specified by a user side by side on the display, and controlling an imaging device to image a medium with an imaging mode set by the user or executing an image processing of an image processing mode set by the user on an image of the medium.

According to the present embodiment, the information processing apparatus, the control method, and the control program can improve usability when a user sets an imaging mode or an image processing mode.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

BRIEF DESCRIPTION OF DRAWINGS

FIG. 4A is a diagram illustrating an example of a data structure of an imaging mode table.

FIG. 4B is a diagram illustrating an example of a data structure of an image processing mode table.

FIG. 16 is a diagram illustrating a schematic configuration of another first processing circuit.

DESCRIPTION OF EMBODIMENTS

Hereinafter, an image reading apparatus, a control method and a control program according to an embodiment will be described with reference to the drawings. However, it should be noted that the technical scope of the invention is not limited to these embodiments, and extends to the inventions described in the claims and their equivalents.

Figure 1:
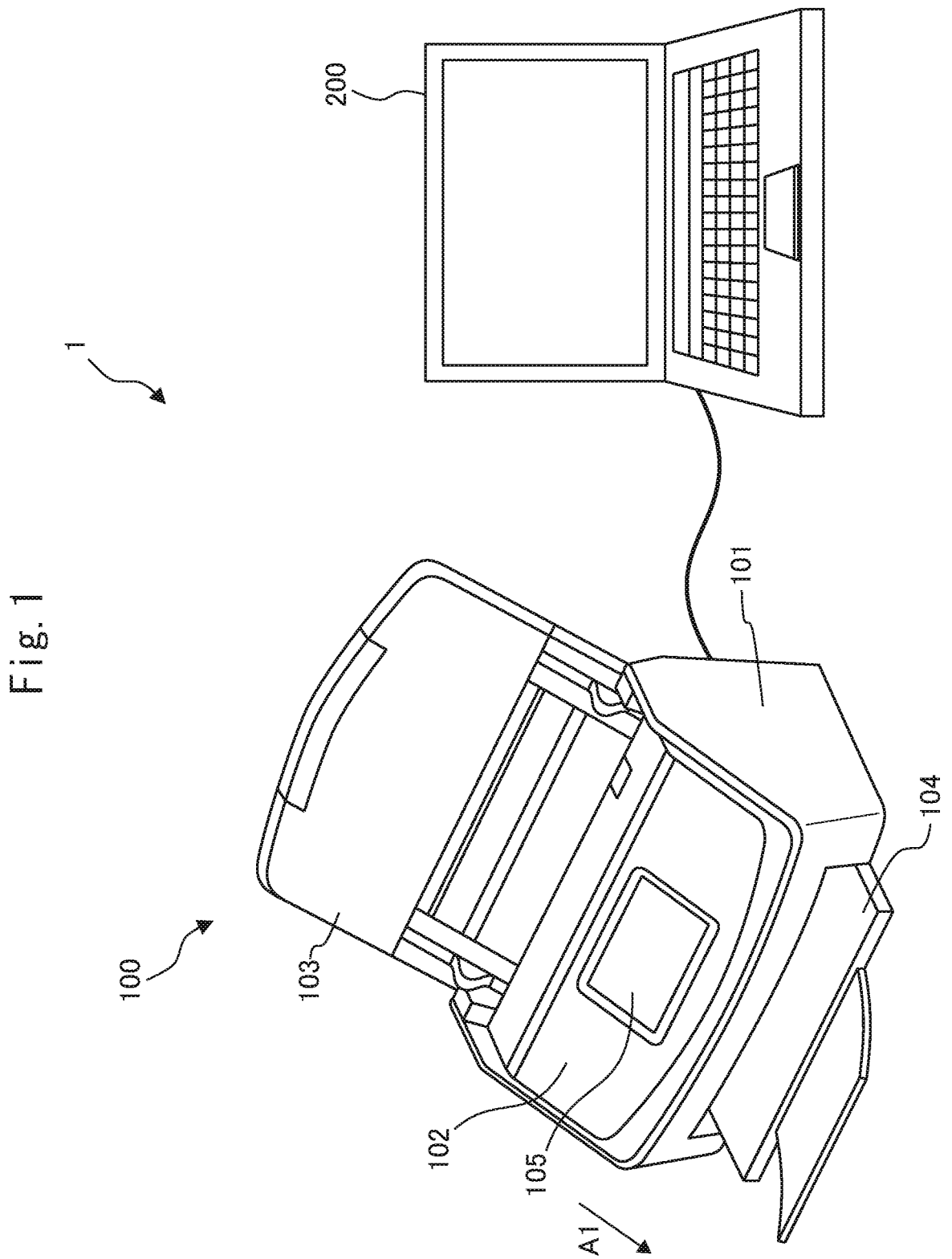
FIG. 1 is a configuration diagram of an example of an image processing system according to an embodiment.

FIG. 1 is a configuration diagram of an example of an image processing system according to an embodiment.

The image processing system 1 includes an image reading apparatus 100 and an information processing apparatus 200. The image reading apparatus 100 and the information processing apparatus 200 are coupled to each other. For example, the image reading apparatus 100 is an image scanner that conveys and images a medium being a document. For example, a medium is paper, thin paper, thick paper, or a card. The medium conveying apparatus 100 may be a facsimile, a copying machine, a multifunctional peripheral (MFP), etc. Further, the image reading apparatus 100 may be an image scanner, a facsimile, a copying machine, or an MFP, the type of which is flatbed, etc., that images a medium without conveying the medium. Further, for example, the image reading apparatus 100 may be a mobile phone, a smartphone, a tablet computer, or a notebook personal computer to image a person, an object, a scene, etc. For example, the information processing apparatus 200 is a personal computer. Further, the information processing apparatus 200 may be a mobile phone, a smartphone, a tablet computer, a notebook personal computer, etc. Further, the information processing apparatus 200 may be a server. In that case, a plurality of image reading apparatuses 100 may be communicatively coupled to one information processing apparatus 200.

The image reading apparatus 100 includes a lower housing 101, an upper housing 102, a loading tray 103, an ejection tray 104, a display operation device 105, etc.

The upper housing 102 is located at a position covering the top surface of the image reading apparatus 100 and is engaged with the lower housing 101. The loading tray 103 is engaged with the lower housing 101, to place a conveyed medium. The ejection tray 104 is engaged with the upper housing 102 and stacks an ejected medium. The ejection tray 104 may be engaged with the lower housing 101.

The display operation device 105 includes a display configured with, for example, a liquid crystal or organic electro-luminescence (EL), and an interface circuit to output image data to the display and displays the image data on the display. The display operation device 105 further includes a touch-panel input device and an interface circuit to acquire a signal from the input device, accepts an operation by a user, and outputs a signal based on the user input. The display device and the operation device may be separately provided.

Figure 2:
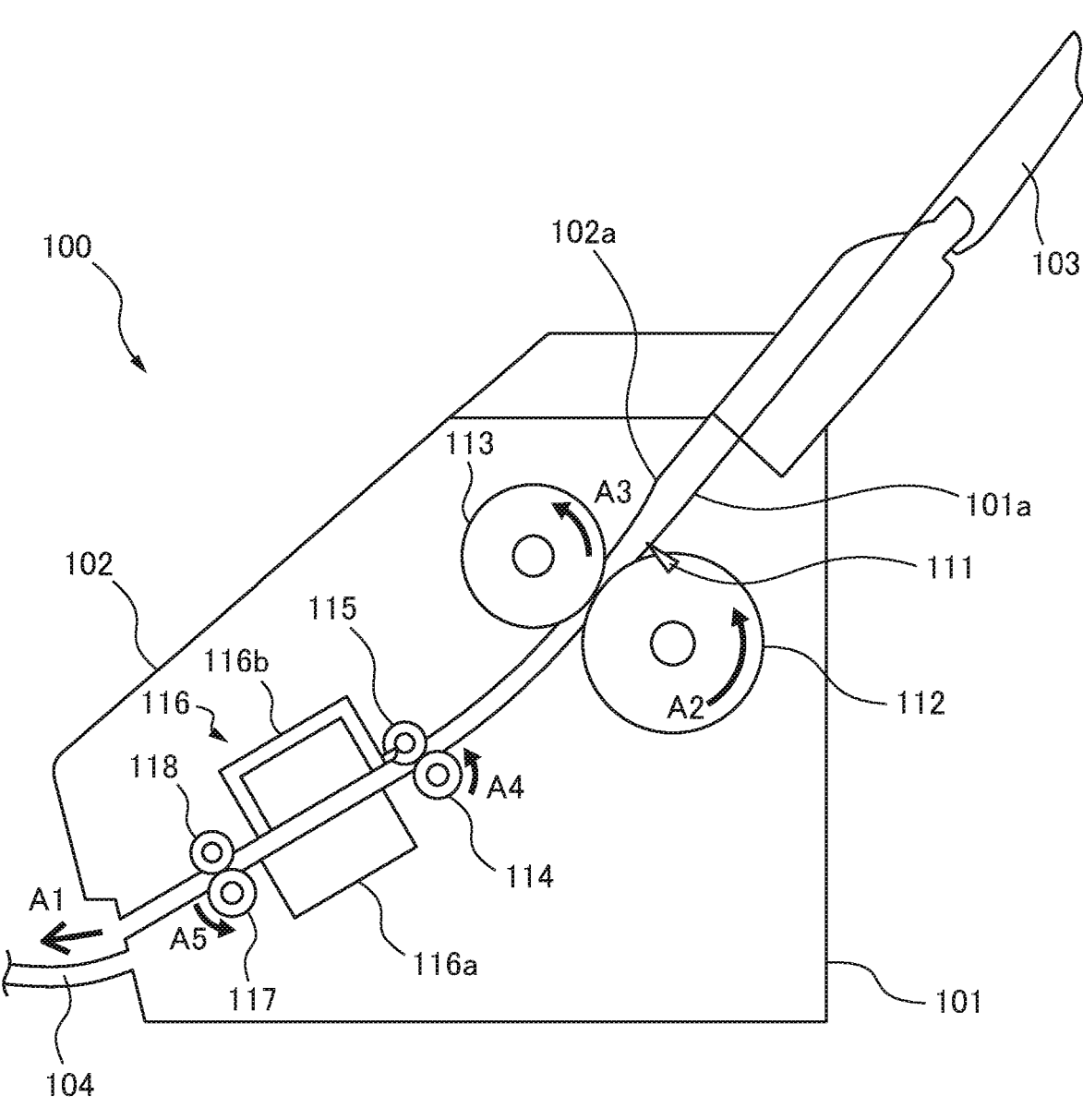
FIG. 2 is a diagram illustrating a conveyance path inside an image reading apparatus.

FIG. 2 is a diagram illustrating an example of a conveyance path inside an image reading apparatus.

The conveyance path inside the image reading apparatus 100 includes a medium sensor 111, a feed roller 112, a separation roller 113, a first conveyance roller 114, a first driven roller 115, an imaging device 116, a second conveyance roller 117, a second driven roller 118, etc.

Each of the numbers of the feed roller 112, the separation roller 113, the first conveyance roller 114, the first driven roller 115, the second conveyance roller 117, and/or the second driven roller 118 is not limited to one and may be more than one. In that case, a plurality of feed rollers 112, separation rollers 113, first conveyance rollers 114, first driven rollers 115, second conveyance rollers 117, and/or second driven rollers 118 are respectively spaced in a width direction perpendicular to the medium conveying direction A1.

The top surface of the lower housing 101 forms a lower guide 101a of the conveyance path of a medium, and the bottom surface of the upper housing 102 forms an upper guide 102a of the conveyance path of a medium. In FIG. 2, an arrow A1 indicates a medium conveying direction. Hereinafter, upstream refers to upstream in the medium conveying direction A1, and downstream refers to downstream in the medium conveying direction A1.

The medium sensor 111 is located on the upstream side of the feed roller 112 and the separation roller 113. The medium sensor 111 includes a contact detection sensor and detects whether a medium is placed on the loading tray 103. The medium sensor 111 generates and outputs a medium signal the signal value of which varies between a state in which a medium is placed on the loading tray 103 and a state in which a medium is not placed. The medium sensor 111 is not limited to a contact detection sensor and any other sensor that can detect the presence of a medium, such as a light detection sensor, may be used as the medium sensor 111.

The feed roller 112 is provided in the lower housing 101, sequentially feeds media placed on the loading tray 103 from the lower side. The separation roller 113 is a so-called brake roller or retard roller, is provided in the upper housing 102, is located in such a way as to face the feed roller 112, and rotates in a direction opposite to the medium feeding direction. The feed roller 112 may be provided in the upper housing 102, and the separation roller 113 may be provided in the lower housing 101; and the feed roller 112 may sequentially feed media placed in the loading tray 103 from the upper side.

The first conveyance roller 114 and the first driven roller 115 are located on the downstream side of the feed roller 112 in such a way as to face each other, and convey a medium fed by the feed roller 112 and the separation roller 113 to the imaging device 116.

The imaging device 116 is an example of an imaging module, is located on the downstream side of the first conveyance roller 114, and images a medium conveyed by the first conveyance roller 114. The imaging device 116 includes a first imaging device 116a and a second imaging device 116b that are located in such a way as to face each other with the medium conveyance path in between. The first imaging device 116a includes a line sensor based on a unity-magnification optical system type contact image sensor (CIS) including complementary metal oxide semiconductor- (CMOS-) based imaging elements linearly arranged in a main scanning direction. The first imaging device 116a further includes lenses each forming an image on an imaging element, and an A/D converter amplifying and analog-digital (A/D) converting an electric signal output from the imaging element. The first imaging device 116a generates an input image by imaging the front side of a conveyed medium in accordance with control from a processing circuit to be described later and outputs the generated image.

Similarly, the second imaging device 116b includes a line sensor based on a unity-magnification optical system type CIS including CMOS-based imaging elements linearly arranged in the main scanning direction. The second imaging device 116b further includes lenses each forming an image on an imaging element, and an A/D converter amplifying and analog-digital (A/D) converting an electric signal output from the imaging element. The second imaging device 116b generates an input image by imaging the back side of a conveyed medium in accordance with control from the processing circuit to be described later and outputs the generated image.

Only one of the first imaging device 116a and the second imaging device 116b may be located and only one side of a medium may be read in the medium conveying apparatus 100. Further, a line sensor based on a unity-magnification optical system type CIS including charge coupled device- (CCD-) based imaging elements may be used in place of the line sensor based on a unity-magnification optical system type CIS including CMOS-based imaging elements. Further, a reduction optical system type line sensor including CMOS-based or CCD-based imaging elements may be used.

The second conveyance roller 117 and the second driven roller 118 are located on the downstream side of the imaging device 116 in such a way as to face each other. The second conveyance roller 117 and the second driven roller 118 eject a medium conveyed by the first conveyance roller 114 and the first driven roller 115 and imaged by the imaging device 116 onto the ejection tray 104.

A medium placed on the loading tray 103 is conveyed between the lower guide 101*a* and the upper guide 101*b* toward the medium conveying direction A1 by the feed roller 112 rotating in a direction of an arrow A2 in FIG. 2, i.e., the medium conveying direction. The separation roller 113 rotates in a direction of an arrow A3, i.e., a direction opposite to the medium feeding direction at the time of medium conveying. When a plurality of media are placed on the loading tray 103, only a medium in contact with the feed roller 112 out of the medium placed on the loading tray 103 is separated by working of the feed roller 112 and the separation roller 113. Consequently, conveyance of a medium other than the separated medium is restricted (prevention of multi feed).

A medium is fed between the first conveyance roller 114 and the first driven roller 115 while being guided by the lower guide 101*a* and the upper guide 101*b*. The medium is fed between the first imaging device 116*a* and the second imaging device 116*b* by the first conveyance roller 114 rotating in directions of an arrow A4. The medium read by the imaging device 116 is ejected onto the ejection tray 104 by the second conveyance roller 117 rotating in directions of an arrow A5.

Figure 3:
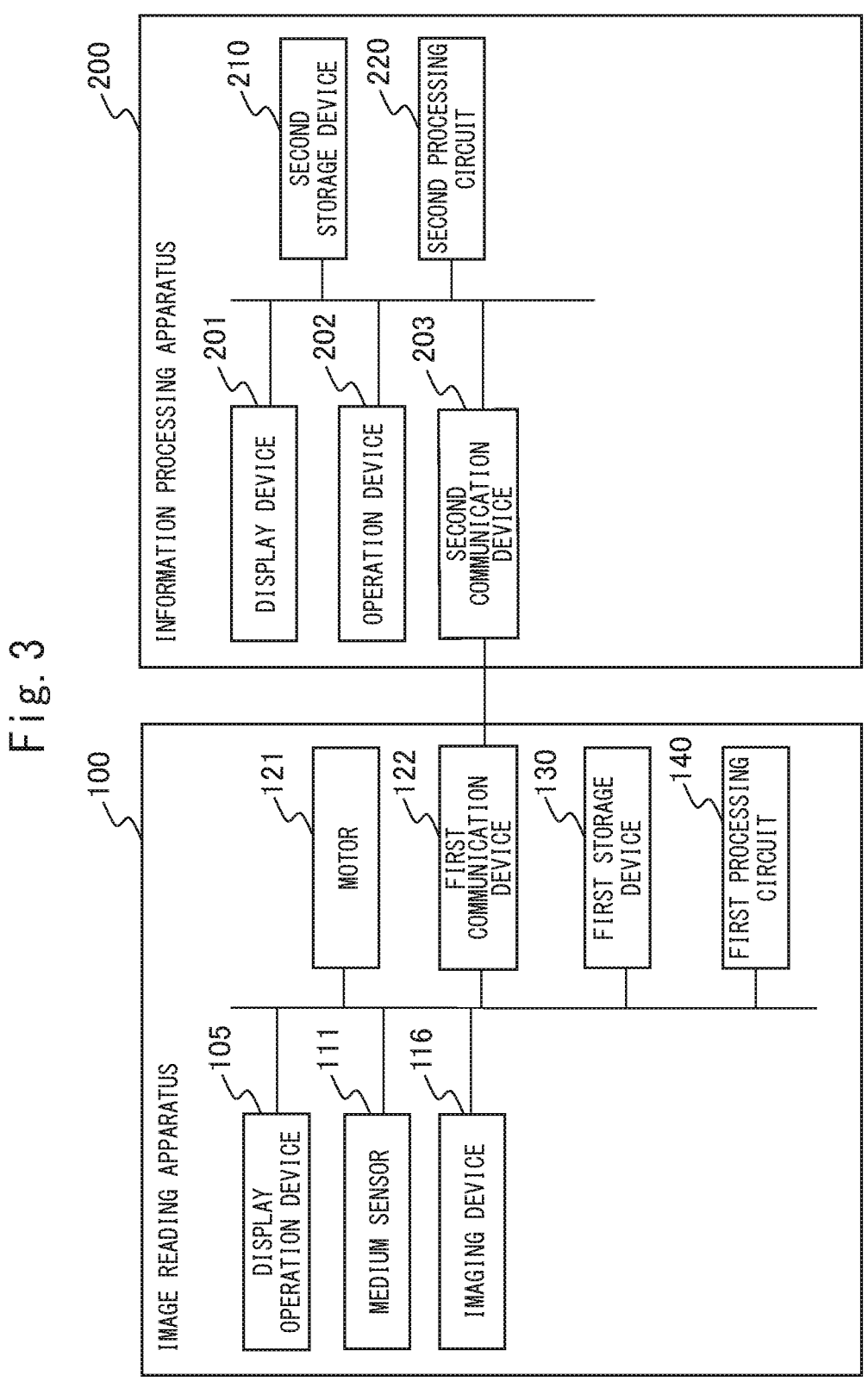
FIG. 3 is a block diagram illustrating a schematic configuration of the image reading apparatus, etc.

FIG. 3 is a block diagram illustrating a schematic configuration of an example of an image reading apparatus and an information processing apparatus.

In addition to the configuration described above, the image reading apparatus 100 further includes a motor 121, an interface device 122, a first storage device 130, a first processing circuit 140, etc.

The motor 121 includes one or a plurality of motors and conveys a medium by rotating the feed roller 112, the separation roller 113, the first conveyance roller 114, the first driven roller 115, the second conveyance roller 117, and the second driven roller 118 in accordance with a control signal from the processing circuit 140. The first driven roller 115 and/or the second driven roller 118 may be driven by the motor 121 instead of being driven to rotate by the first conveyance roller 114 or the second conveyance roller 117.

The first communication device 122 includes an antenna to transmit and receive wireless signals and a wireless communication interface circuit for transmitting and receiving signals through a wireless communication line in accordance with a communication protocol such as a wireless local area network (LAN). The first communication device 122 can communicate with the information processing apparatus 200 and transmits and receives various types of images and information by being communicatively coupled to the information processing apparatus 200. The first communication device 122 may include a wired communication interface circuit conforming to a communication protocol such as the transmission control protocol/internet protocol (TCP/IP) and be coupled to the information processing apparatus 200 through a network. Further, the first communication device 122 may include an interface circuit conforming to a serial bus such as a universal serial bus (USB) and be coupled to the information processing apparatus 200 through a cable such as a USB cable.

The first storage device 130 includes a memory device such as a random-access memory (RAM) or a read-only memory (ROM), a fixed disk device such as a hard disk, a portable storage device such as a flexible disk or an optical disk, etc. Further, a computer program, a database, a table, etc., that are used for various types of processing in the image reading apparatus 100 are stored in the first storage device 130. The computer programs may be installed on the first storage device 130 from a computer-readable, non-transitory portable storage medium by using a well-known set-up program, etc. The portable storage medium is, for example, a compact disc read-only memory (CD-ROM) or a digital versatile disc read-only memory (DVD-ROM).

The first processing circuit 140 operates in accordance with a program stored in advance in the first storage device 130. For example, the processing circuit is a central processing unit (CPU). A digital signal processor (DSP), a large scale integration (LSI), an application specific integrated circuit (ASIC), and a field-programmable gate array (FPGA) may be used as the first processing circuit 140.

The first processing circuit 140 is coupled to the display operation device 105, the medium sensor 111, the imaging device 116, the motor 121, the interface device 122, the first storage device 130, etc., and controls the components. The first processing circuit 140 receives information indicating an imaging mode or an image processing mode from the information processing apparatus 200 through the first communication device 122 and sets the imaging mode or image processing mode to the first storage device 130. In accordance with the set imaging mode or image processing mode, the first processing circuit 140 controls the imaging device 116 or executes image process on an input image acquired from the imaging device 116.

The information processing apparatus 200 includes a display device 201, an operation device 202, a second communication device 203, a second storage device 210, a second processing circuit 220, etc.

The display device 201 is an example of a display and includes a display configured with, for example, a liquid crystal or organic EL, and an interface circuit to output image data to the display and displays the image data on the display in accordance with an instruction from the second processing circuit 220.

The operation device 202 includes an input device and an interface circuit to acquire a signal from the input device, accepts an operation by a user, and outputs a signal based on the user input to the second processing circuit 220. The display device and the operation device may be integrally provided by using a touch-panel input device.

The second communication device 203 is an example of a communication device for communicating with the image reading apparatus 100 and includes an interface circuit similar to that of the first communication device 122. The second communication device 203 can communicate with the image reading apparatus 100 and transmits and receives various types of images and information by being communicatively coupled to the image reading apparatus 100.

The second storage device 210 is an example of a storage, and includes a memory device such as a RAM or a ROM, a fixed disk device such as a hard disk, a portable storage device such as a flexible disk or an optical disk, etc. Further, a computer program, a database, a table, etc., that are used for various types of processing in the information processing apparatus 200 are stored in the second storage device 210. The computer programs may be installed on the second storage device 210 from a computer-readable, non-transitory portable storage medium, such as a CD-ROM or a DVD-ROM, by using a well-known set-up program, etc. Further, an imaging mode table and an image processing mode table are stored in the second storage device 210 as data. Details of the imaging mode table and the image processing mode table will be described later.

The second processing circuit 220 operates in accordance with a program stored in advance in the second storage device 210. For example, the processing circuit is a CPU. A DSP, an LSI, an ASIC, and a FPGA may be used as the first processing circuit 220.

The second processing circuit 220 is coupled to the display device 201, the operation device 202, the second communication device 203, the second storage device 210, etc., and controls the components. The second processing circuit 220 controls each device and sets an imaging mode or an image processing mode to the image reading apparatus 100.

FIG. 4A is a diagram illustrating an example of a data structure of the imaging mode table.

As illustrated in FIG. 4A, for each of a plurality of imaging modes, a comparative imaging mode, a sample image, a comparative sample image, etc., are stored in advance in the imaging mode table in association with one another. The imaging mode is one of functions included in a profile set for each user in the image reading apparatus 100 and is setting information for defining operation when the image reading apparatus 100 images a medium. The imaging mode includes a setting related to resolution or gradation range of an image, etc.

Resolution and gradation range of an image are set as the imaging mode in the example illustrated in FIG. 4A. For example, 200 dpi (dots per inch) or 300 dpi is set as resolution of an image. Gradation range of each pixel in an image, such as 0 to 255 or 0 to 65535, is set as gradation range of the image.

The imaging mode may include any other factor (item) related to imaging of a medium. Further, the imaging mode may include any combination of the factors. The imaging mode has only to include at least one factor of the factors.

The comparative imaging mode is an imaging mode different from the imaging mode to which the comparative imaging mode corresponds, and is an exclusive function selected exclusively from the imaging mode to which the comparative imaging mode corresponds. In a comparative imaging mode, factors of the same types as factors set in an imaging mode to which the comparative imaging mode corresponds (resolution or gradation range) are set as the factors of the comparative imaging mode, and at least one of the factors is set to a different value from the imaging mode to which the comparative imaging mode corresponds. In the example illustrated in FIG. 4A, "RESOLUTION=1200 dpi, GRADATION RANGE=0 to 255" is set as the comparative imaging mode of the imaging mode "RESOLUTION=200 dpi, GRADATION RANGE=0 to 255." "RESOLUTION=1200 dpi, GRADATION RANGE=0 to 255" is set as the comparative imaging mode of the imaging mode "RESOLUTION=300 dpi, GRADATION RANGE=0 to 255."

The sample image is an image in which a sample medium is imaged with the imaging mode. For example, the sample medium is a medium, such as paper, thin paper, thick paper, or a card, conveyed by a medium conveying apparatus. For example, the sample medium preferably includes a character, a ruled line, a pattern, and/or an image that causes a feature and an effect of each imaging mode or each image processing mode, to be described later, to stand out. The comparative sample image is an image of the same sample medium, included in a corresponding sample image, imaged with the comparative imaging mode. Each sample image and each comparative sample image are generated in accordance with a predetermined default setting for factors other than factors specified in the imaging mode (such as color or brightness).

FIG. 4B is a diagram illustrating an example of a data structure of the image processing mode table.

As illustrated in FIG. 4B, for each of a plurality of image processing modes, a comparative image processing mode, a sample image, a comparative sample image, etc., are stored in advance in the image processing mode table in association with one another. The image processing mode is one of the functions included in a profile set for each user in the image reading apparatus 100 and is setting information for defining details of an image processing executed on an image imaged by the image reading apparatus 100. The image processing mode includes a setting related to color, hue, chroma, brightness, or noise elimination of an image.

Binary, gray scale, or color is set as the color of an image in the example illustrated in FIG. 4B. When binary is set as the color of an image, normal (no elimination), ground pattern elimination, ground tracking, etc., is set as noise elimination. Ground pattern elimination is a setting for eliminating a ground pattern (a continuous pattern such as a checked pattern, a wavy pattern, or hatching) included in the background of a medium by using a known image processing technology. Ground tracking is a setting for adjusting a threshold value for binarization in such a way that the background in an image with a background color other than white, such as newspaper, becomes white pixels.

When gray scale is set as the color of an image, normal (no elimination), contour emphasis, moire elimination, etc., is set as noise elimination. Contour emphasis is a setting for emphasizing a contour (edge) of a character or a figure in an image by using a known image processing technology. Moire elimination is a setting for eliminating moire (interference fringes) in an image by using a known image processing technology.

When color is set as the color of an image, normal (no correction), contrast-first, tint-first, etc., is set as image correction. Contrast-first is a setting for generating a clear image by clarifying the color contrast (by increasing the difference in brightness) in an image by using a known image processing technology. Tint-first is a setting for generating a smooth image by clarifying the difference in color (by increasing the difference in a hue) in an image by using a known image processing technology. For example, the setting related to hue, chroma, or brightness may include a setting for correcting brightness, hue, etc., by gamma correction or level correction, or a setting for correcting brightness, hue, chroma, etc., by multiplying or adding a predetermined coefficient or an offset value.

The image processing mode may include any other factors related to an image processing. Further, the image processing mode may include any combination of the factors. The image processing mode has only to include at least one factor out of the factors.

The comparative image processing mode is an image processing mode different from the image processing mode to which the comparative image processing mode corresponds, and is an exclusive function selected exclusively from the image processing mode to which the comparative image processing mode corresponds. In the example illustrated in FIG. 4A, "COLOR (NORMAL)" is set as the comparative image processing mode of the image processing mode "BINARY (NORMAL)." "BINARY (NORMAL)" is set as the comparative image processing mode of the image processing mode "BINARY+GROUND PATTERN ELIMINATION." "BINARY (NORMAL)" is set as the comparative image processing mode of the image processing mode "BINARY+GROUND TRACKING." "COLOR (NORMAL)" is set as the comparative image processing mode of the image processing mode "GRAY SCALE (NOR-MAL)." "GRAY SCALE+MOIRE ELIMINATION" is set as the comparative image processing mode of an image processing mode "GRAY SCALE+CONTOUR EMPHA-SIS." "GRAY SCALE+CONTOUR EMPHASIS" is set as the comparative image processing mode of the image processing mode "GRAY SCALE+MOIRE ELIMINATION." "GRAY SCALE (NORMAL)" is set as the comparative image processing mode of the image processing mode "COLOR (NORMAL)." "COLOR+CONTRAST-FIRST" is set as the comparative image processing mode of the image processing mode "COLOR+TINT-FIRST." "COLOR+TINT-FIRST" is set as the comparative image processing mode of the image processing mode "COLOR+CON-TRAST-FIRST."

It is preferable to set an image processing mode that does not include a feature of an image processing mode to which a comparative image processing corresponds as the com-parative image processing. It is particularly preferable to set an image processing mode that includes a feature different from a feature of an image processing mode to which the comparative image processing mode corresponds (for example, tint-first as opposed to contrast-first) as the com-parative image processing mode.

The sample image is an image acquired by executing the image processing of the image processing mode on an image of a sample medium. The comparative sample image is an image acquired by executing the image processing of a comparative image processing mode corresponding to the image processing mode on an image of the sample medium identical to the sample medium included in the correspond-ing sample image. Each sample image and each comparative sample image are generated in accordance with a predeter-mined default setting for factors other than factors specified by an image processing mode (such as a resolution or a gradation range).

Figure 5:
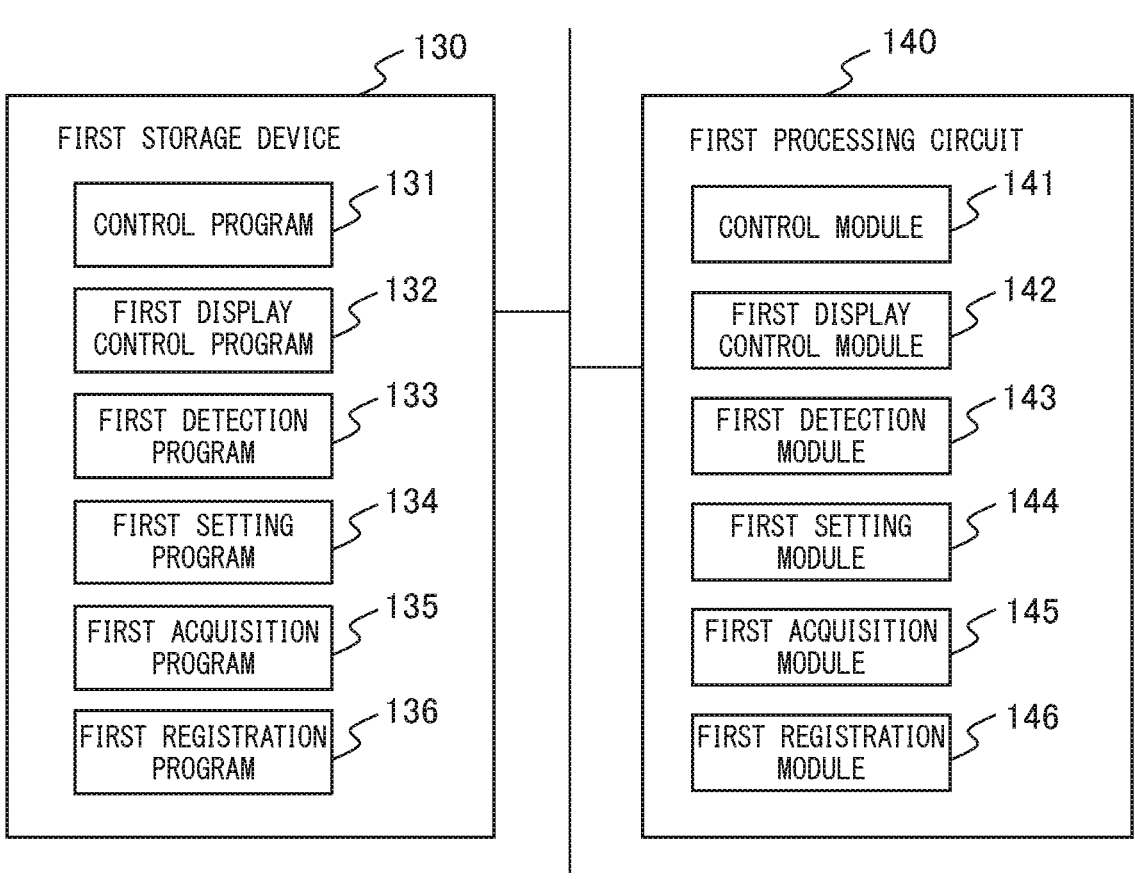
FIG. 5 is a diagram illustrating a schematic configuration of a first storage device and a first processing circuit.

FIG. 5 is a diagram illustrating a schematic configuration of the first storage device and the first processing circuit of the image reading apparatus.

As illustrated in FIG. 5, a control program 131, a first display control program 132, a first detection program 133, a first setting program 134, a first acquisition program 135, a first registration program 136, etc., are stored in the first storage device 130. Each program is a functional module implemented by software operating on the processor. The first processing circuit 140 reads each program stored in the first storage device 130 and operates in accordance with the read program. Consequently, the first processing circuit 140 functions as a control module 141, a first display control module 142, a first detection module 143, a first setting module 144, a first acquisition module 145, and a first registration module 146.

Figure 6:
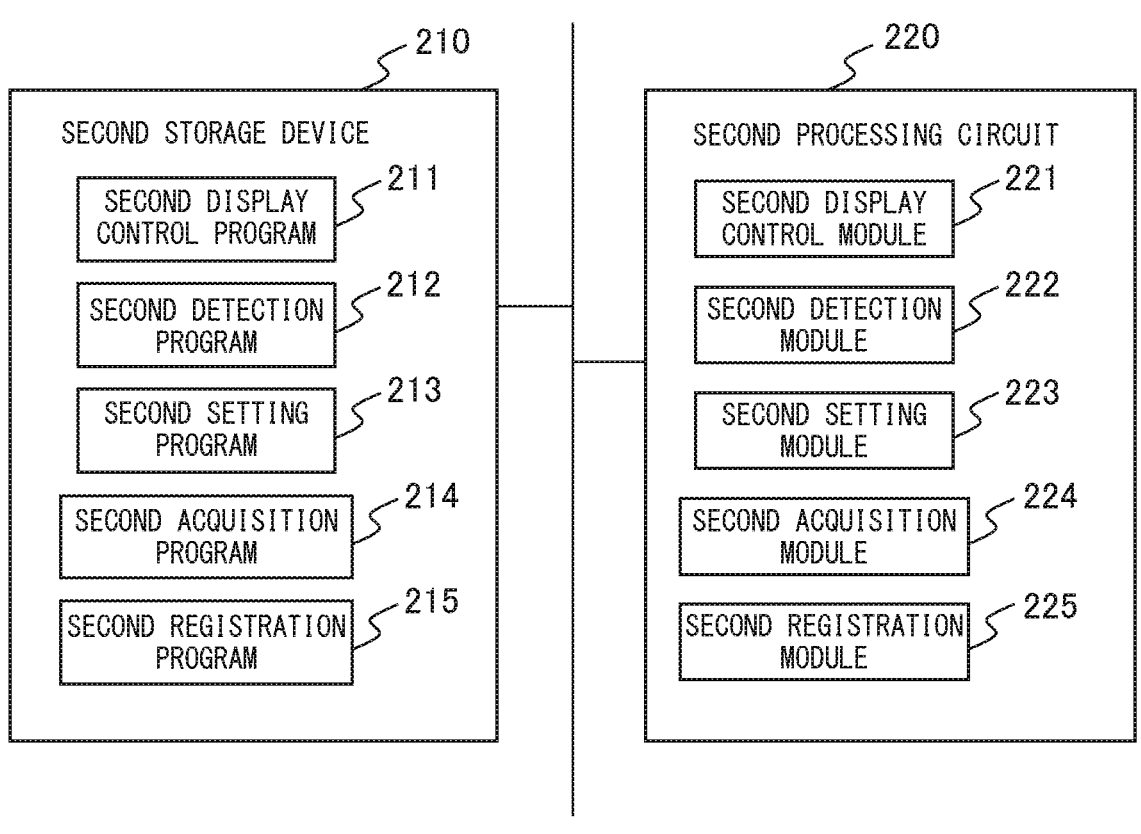
FIG. 6 is a diagram illustrating a schematic configuration of a second storage device and a second processing circuit.

FIG. 6 is a diagram illustrating a schematic configuration of the second storage device and the second processing circuit of the information processing apparatus.

As illustrated in FIG. 6, a second display control program 211, a second detection program 212, a second setting program 213, a second acquisition program 214, a second registration program 215, etc., are stored in the second storage device 210. Each program is a functional module implemented by software operating on the processor. The second processing circuit 220 reads each program stored in the second storage device 210 and operates in accordance with the read program. Consequently, the second processing circuit 220 functions as a second display control module 221, a second detection module 222, a second setting module 223, a second acquisition module 224, and a second registration module 225. The second display control module 221, the second detection module 222, the second setting module 223, the second acquisition module 224, and the second registration module 225 are examples of a display control module, a detection module, a setting module, an acquisition module, and a registration module, respectively.

Figure 7:
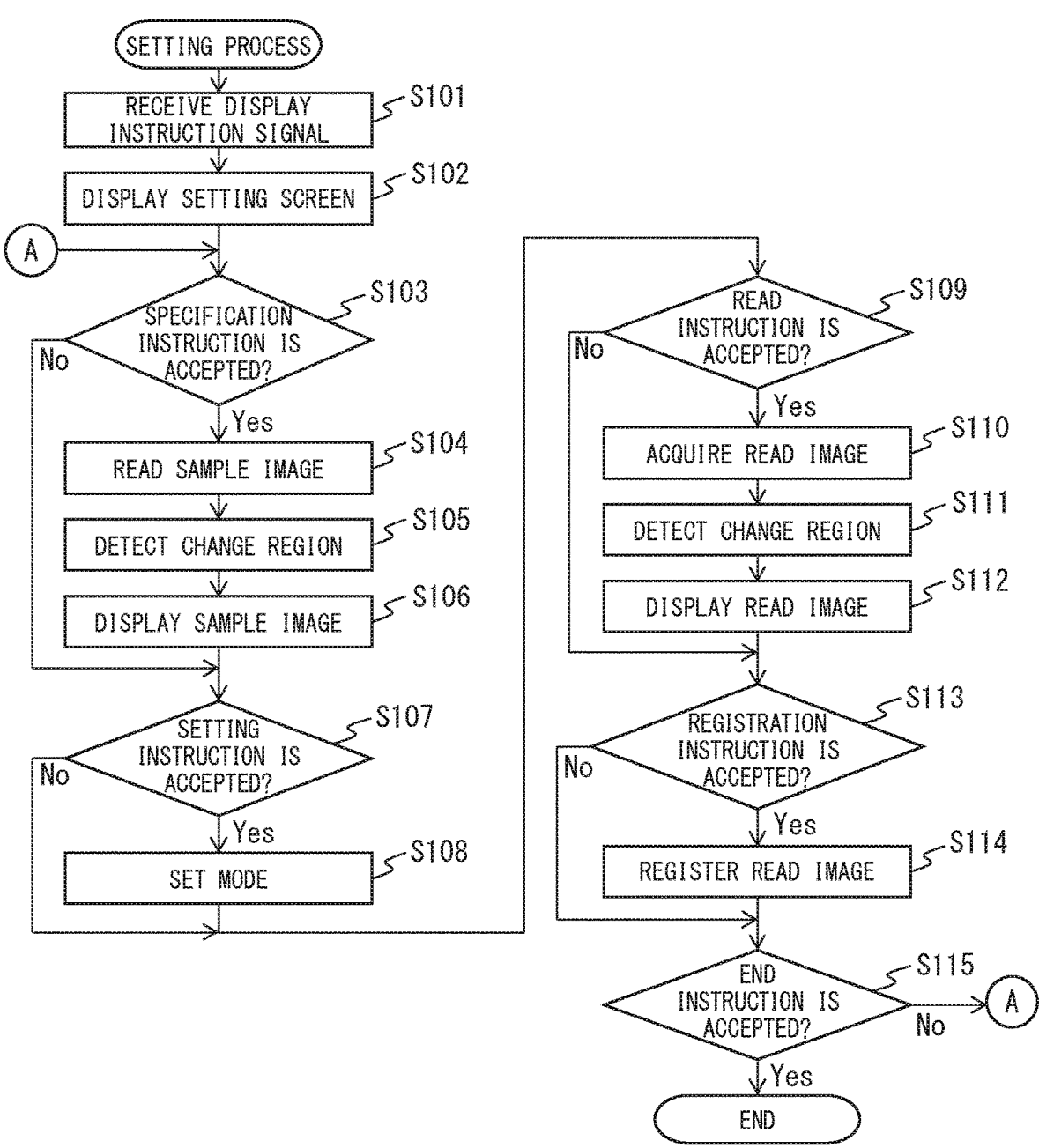
FIG. 7 is a flowchart illustrating an operation example of a setting process.

FIG. 7 is a flowchart illustrating an operation example of setting process in the information processing apparatus.

The operation example of the setting process in the information processing apparatus 200 will be described below referring to the flowchart illustrated in FIG. 7. The operation flow described below is executed mainly by the second processing circuit 220 in accordance with a program previously stored in the second storage device 210 in cooperation with the components in the information pro-cessing apparatus 200.

First, the second display control module 221 waits until a display instruction of a setting screen is input by a user through the operation device 202 and a display instruction signal providing an instruction to display the setting screen is received from the operation device 202 (step S101). The setting screen is a screen for a user to set the imaging mode or the image processing mode of the image reading appa-ratus 100. The display instruction signal includes mode information indicating the imaging mode or the image processing mode.

Next, when receiving a display instruction signal, the second display control module 221 displays a setting screen on the display device 201 (step S102). The second display control module 221 displays an imaging mode setting screen for setting the imaging mode when the mode information included in the display instruction signal indicates the imag-ing mode. On the other hand, the second display control module 221 displays an image processing mode setting screen for setting the image processing mode when the mode information included in the display instruction signal indi-cates the image processing mode.

Figure 8:
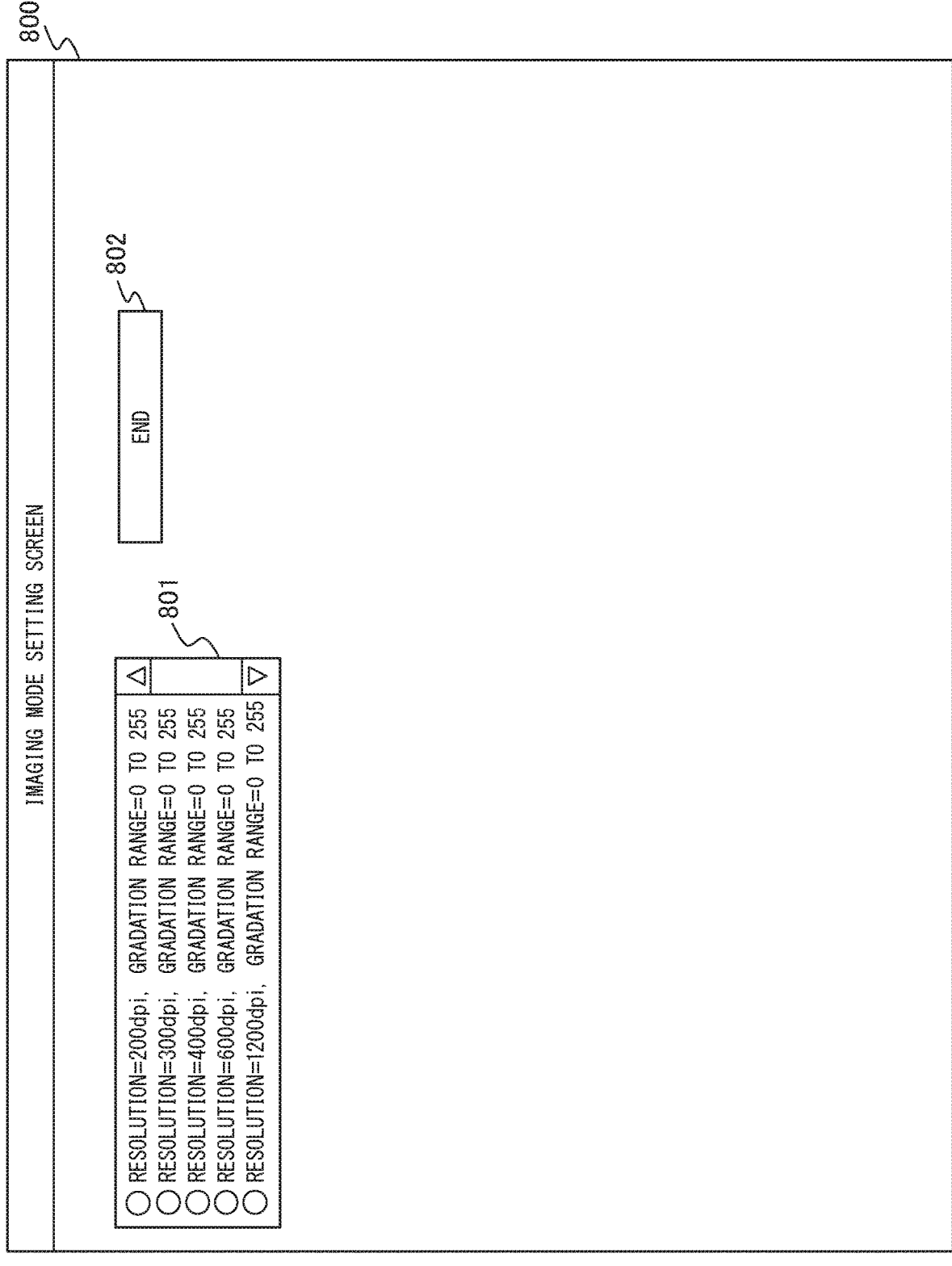
FIG. 8 is a schematic diagram illustrating an example of an imaging mode setting screen.

FIG. 8 is a schematic diagram illustrating an example of an imaging mode setting screen.

As illustrated in FIG. 8, the imaging mode setting screen 800 includes a selection region 801, and an END button 802. A plurality of imaging modes stored in the imaging mode table are displayed in the selection region 801 to be select-able by a user. In the example illustrated in FIG. 8, each imaging mode is selected by a radio button. Each imaging mode may be selected by placing a cursor on a region where characters of each imaging mode are displayed. The END button 802 is a button for ending display of the imaging mode setting screen 800.

Figure 9:
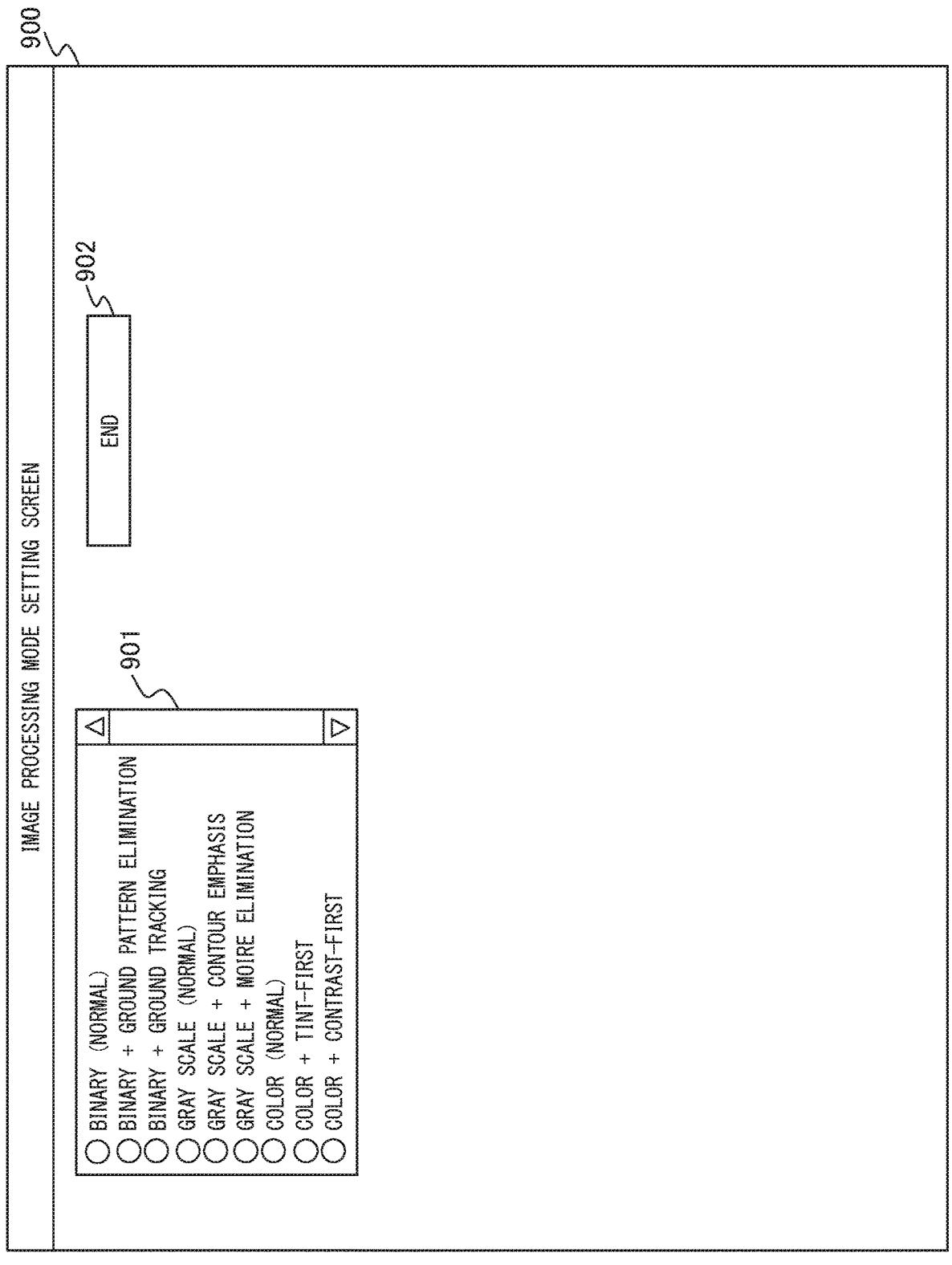
FIG. 9 is a schematic diagram illustrating an example of an image processing mode setting screen.

FIG. 9 is a schematic diagram illustrating an example of an image processing mode setting screen.

As illustrated in FIG. 9, the image processing mode setting screen 900 includes a selection region 901 and an END button 902. A plurality of image processing modes stored in the image processing mode table are displayed in the selection region 901 to be selectable by a user. In the example illustrated in FIG. 9, each image processing mode is selected by a radio button. Each image processing mode may be selected by placing a cursor on a region where characters of each imaging mode are displayed. The END button 902 is a button for ending display of the image processing mode setting screen 900.

Next, the second display control module 221 determines whether or not a specification instruction of an imaging mode or an image processing mode from a user is accepted (step S103). The second display control module 221 accepts a specification instruction of an imaging mode or an image processing mode from the user when one imaging mode or image processing mode is specified by the user selection on each setting screen through the operation device 202. When not accepting a specification instruction of an imaging mode or image processing mode from the user, the second display control module 221 moves the process to step S107.

On the other hand, when accepting a specification instruction of an imaging mode or an image processing mode from the user, the second display control module 221 reads the sample image and the comparative sample image corresponding to the imaging mode or the image processing mode specified by the user from the second storage device 210 (step S104). By referring to the imaging mode table or the image processing mode table, the second display control module 221 identifies the comparative imaging mode or the comparative image processing mode corresponding to the specified imaging mode or image processing mode and identifies the sample image corresponding to the specified imaging mode or image processing mode and the comparative sample image corresponding to the identified comparative imaging mode or comparative image processing mode.

Next, the second detection module 222 detects change regions different from each other in the sample image and the comparative sample image read by the second display control module 221 (step S105). For each of mutually related pixels in the sample image and the comparative sample image, the second detection module 222 calculates the difference in a gradient value (a brightness value or a color value). The second detection module 222 groups pixels of which the calculated difference is greater than or equal to a gradation threshold value by labeling and detects the grouped pixels as the change region. For example, the gradation threshold value is set to a difference in a gradient value (such as 20) allowing a person to determine the difference in brightness on an image by visual observation. The second detection module 222 may detect a circumscribed rectangular region of each group as the change region.

The second detection module 222 may divide the sample image and the comparative sample image into a plurality of regions and, for each of mutually related regions, may calculate a similarity level indicating a degree of similarity between regions. For example, the similarity level is a sum of squared difference (SSD), a sum of absolute difference (SAD), or a normalized cross-correlation. When the similarity level is calculated in such a way that the similarity level increases as regions become more similar, the second detection module 222 detects a region with a similarity level less than or equal to a threshold value as the change region. In that case, the second detection module 222 may detect a predetermined number of regions in ascending order of similarity level as the change regions. On the other hand, when the similarity level is calculated in such a way that the similarity level decreases as regions become more similar, the second detection module 222 detects a region with a similarity level greater than or equal to a threshold value as the change region. In that case, the second detection module 222 may detect a predetermined number of regions in descending order of similarity level as the change regions.

Next, the second display control module 221 displays the sample image and the comparative sample image corresponding to the imaging mode or the image processing mode specified by the user side by side on the display device 201 (step S106). Further, the second display control module 221 distinguishably displays the change region in the sample image or the comparative sample image detected by the second detection module 222.

14

Figure 10:
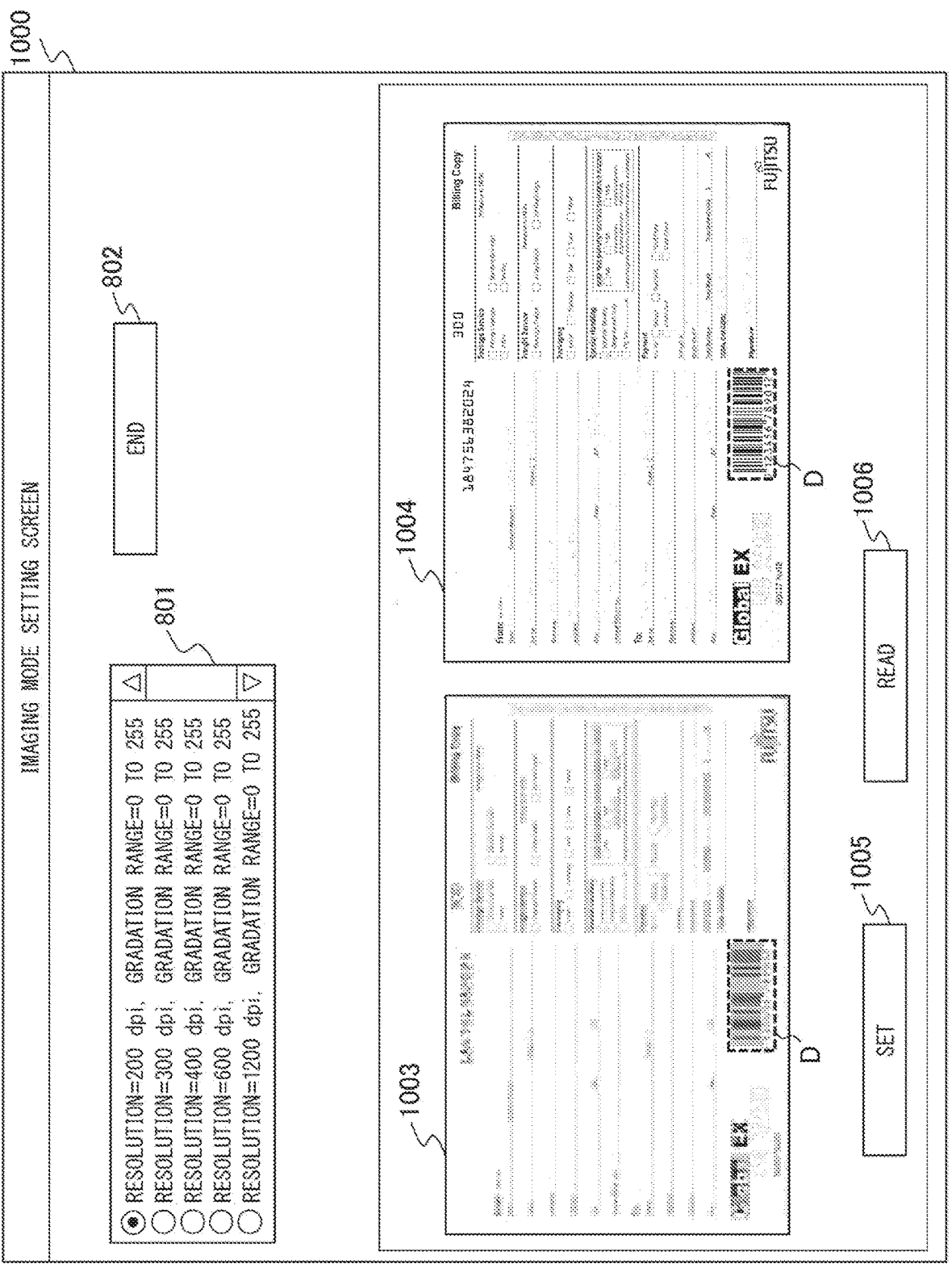
FIG. 10 is a schematic diagram illustrating an example of an imaging mode setting screen.

FIG. 10 is a schematic diagram illustrating an example of an imaging mode setting screen on which the sample image and the comparative sample image are displayed.

As illustrated in FIG. 10, the imaging mode setting screen 1000 includes a sample image 1003, a comparative sample image 1004, a SET button 1005, a READ button 1006, etc., in addition to the selection region 801 and the END button 802. The sample image 1003 is an image of a sample medium imaged with the imaging mode specified in the selection region 801. The comparative sample image 1004 is an image of the sample medium imaged with a comparative imaging mode corresponding to the imaging mode specified in the selection region 801. Regions D surrounded by dotted lines in the sample image 1003 and the comparative sample image 1004 are the change regions detected by the second detection module 222. The regions D may be distinguishably displayed in a different style such as changing the color relative to other regions. Further, the region D may be displayed in only either the sample image 1003 or the comparative sample image 1004.

The SET button 1005 is a button for setting the imaging mode specified in the selection region 801 to the image reading apparatus 100. The READ button 1006 is a button for newly generating images of a medium imaged with the imaging mode specified in the selection region 801 and the comparative imaging mode corresponding to the imaging mode, respectively, by the image reading apparatus 100.

Figure 11:
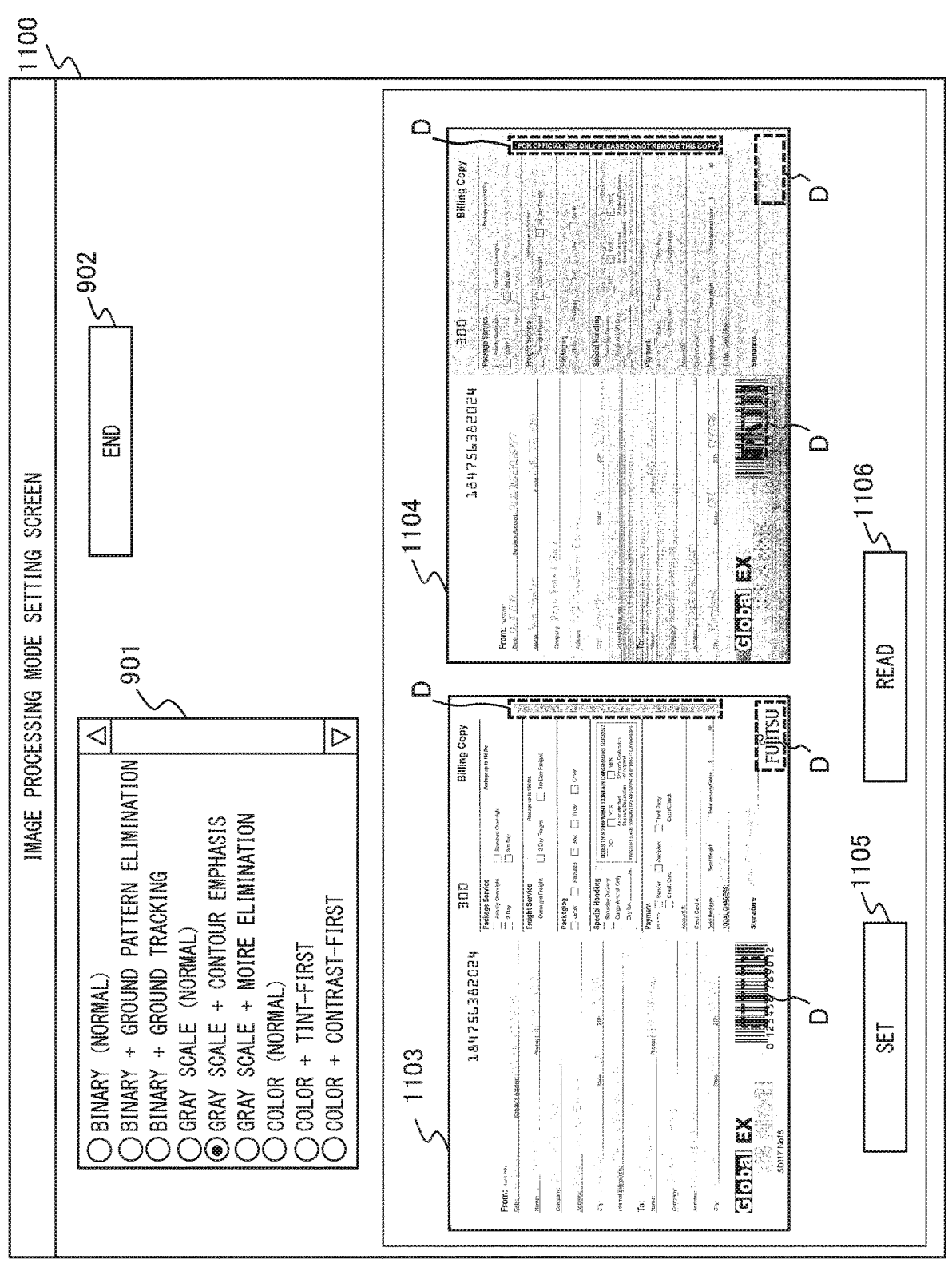
FIG. 11 is a schematic diagram illustrating an example of an image processing mode setting screen.

FIG. 11 is a schematic diagram illustrating an example of an image processing mode setting screen on which the sample image and the comparative sample image are displayed.

As illustrated in FIG. 11, the image processing mode setting screen 1100 includes a sample image 1103, a comparative sample image 1104, a SET button 1105, and a READ button 1106 in addition to the selection region 901 and the END button 902. The sample image 1103 is an image acquired by executing the image processing of the image processing mode specified in the selection region 901 on an image of a sample medium. The comparative sample image 1104 is an image acquired by executing the image processing of a comparative image processing mode corresponding to the image processing mode specified in the selection region 901 on the image of the sample medium. A region D surrounded by dotted lines in the sample image 1103 and the comparative sample image 1104 is a change region detected by the second detection module 222. The region D may be distinguishably displayed in a different style such as changing the color relative to other regions. Further, the region D may be displayed in only either the sample image 1103 or the comparative sample image 1104.

The SET button 1105 is a button for setting the image processing mode specified in the selection region 901 to the image reading apparatus 100. The READ button 1106 is a button for executing the image processing of the image processing mode specified in the selection region 901 and the comparative image processing mode corresponding to the image processing mode by the image reading apparatus 100 on an image of a medium, which is newly imaged by the image reading apparatus 100.

As illustrated in FIG. 10 and FIG. 11, by displaying the sample image and the comparative sample image side by side, a user can intuitively recognize a feature and an effect of a specified imaging mode or image processing mode and can select a more suitable imaging mode or image processing mode based on the purpose of the user or the type of imaging target medium. Accordingly, the image reading apparatus 100 can improve usability when the user sets an imaging mode or image processing mode.

By distinguishably displaying regions different from each other in the sample image and the comparative sample image, a user can more specifically recognize a feature and an effect of the specified imaging mode or image processing mode. Accordingly, the image reading apparatus 100 can further improve usability when the user sets an imaging mode or an image processing mode.

Next, the second display control module 221 determines whether or not a setting instruction of the imaging mode or the image processing mode is accepted from the user (step S107). When the SET button in each setting screen is pressed by the user through the operation device 202, the second display control module 221 accepts the setting instruction of an imaging mode or an image processing mode from the user. When not accepting the setting instruction of the imaging mode or the image processing mode from the user, the second display control module 221 moves the process to step S109.

On the other hand, when the second display control module 221 accepts the setting instruction of the imaging mode or the image processing mode from the user, the second setting module 223 sets the imaging mode or the image processing mode set by the user to the image reading apparatus 100 through the second communication device 203 (step S108). When the SET button in each setting screen is pressed, the second setting module 223 identifies the imaging mode or the image processing mode specified in the selection region as the imaging mode or the image processing mode set by the user. The second setting module 223 generates a setting signal for setting the imaging mode or the image processing mode to the image reading apparatus 100 and transmits the signal to the image reading apparatus 100 through the second communication device 203. The setting signal includes information indicating the imaging mode or the image processing mode set by the user. When receiving the setting signal from the information processing apparatus 200 through the first communication device 122, the control module 141 in the image reading apparatus 100 sets the imaging mode or the image processing mode indicated by the information included in the received setting signal as a profile by storing the imaging mode or the image processing mode into the first storage device 130.

When a plurality of image reading apparatuses 100 are communicatively coupled to the information processing apparatus 200, the second setting module 223 may set the imaging mode or the image processing mode set by the user to the plurality of image reading apparatuses 100.

Next, the second display control module 221 determines whether or not a read instruction is accepted from the user (step S109). When the READ button in each setting screen is pressed by the user through the operation device 202, the second display control module 221 accepts the read instruction from the user. When not accepting the read instruction from the user, the second display control module 221 moves the process to step S113.

On the other hand, when the second display control module 221 accepts the read instruction from the user, the second acquisition module 224 acquires a read image and a comparative read image from the image reading apparatus 100 through the second communication device 203 (step S110).

When the imaging mode is specified by the user, the read image is an input image generated by newly imaging a medium by the imaging device 116 with the imaging mode specified by the user on the image reading apparatus 100. In that case, the comparative read image is an input image generated by newly imaging the medium by the imaging device 116 with the comparative imaging mode corresponding to the imaging mode specified by the user on the image reading apparatus 100.

On the other hand, when an image processing mode is specified by the user, the read image is an image acquired by executing the image processing of the image processing mode specified by the user on the image reading apparatus 100 on an input image generated by newly imaging a medium by the imaging device 116. In that case, the comparative read image is an image acquired by executing the image processing of a comparative image processing mode corresponding to the image processing mode specified by the user on the image reading apparatus 100 on the input image generated by newly imaging medium by the imaging device 116.

The second acquisition module 224 identifies the imaging mode or the image processing mode specified in the selection region in each setting screen as the imaging mode or image processing mode specified by the user when the READ button in the setting screen is pressed. The second acquisition module 224 generates a read instruction signal for providing an instruction to read a medium to the image reading apparatus 100 and transmits the signal to the image reading apparatus 100 through the second communication device 203. The read instruction signal includes information indicating the imaging mode or the image processing mode specified by the user. When receiving the read instruction signal from the information processing apparatus 200 through the first communication device 122, the control module 141 in the image reading apparatus 100 identifies the imaging mode or the image processing mode indicated by the information included in the received read instruction signal. The control module 141 generates a read image in accordance with medium reading process, to be described later, and transmits the generated read image to the information processing apparatus 200 through the first communication device 122.

When an imaging mode is identified, the control module 141 conveys a medium newly placed in the loading tray 103 by the user, images the medium by the imaging device 116 with the identified imaging mode, and acquires a generated input image as the read image. On the other hand, when an image processing mode is identified, the control module 141 conveys the medium newly placed in the loading tray 103 by the user, images the medium by the imaging device 116, and acquires a generated input image. The control module 141 generates the read image by executing the image processing of the identified image processing mode on the acquired input image.

Next, the second acquisition module 224 refers to the imaging mode table or the image processing table and identifies the comparative imaging mode or the comparative image processing mode corresponding to the imaging mode or the image processing mode specified by the user. The second acquisition module 224 transmits the read instruction signal for instructing the image reading apparatus 100 to transmit the comparative read image to the image reading apparatus 100 through the second communication device 203, similarly to acquisition of a read image. The control module 141 generates the comparative read image and transmits the image to the information processing apparatus 200 through the first communication device 122, similarly to generation of the read image.

When an image processing mode is identified, the image reading apparatus 100 may generate the read image and the comparative read image together in one imaging process and transmit the read image and the comparative read image together to the information processing apparatus 200. In that case, the second acquisition module 224 includes information indicating the image processing mode specified by the user and the comparative image processing mode corresponding to the image processing mode into the read instruction signal. The control module 141 identifies the image processing mode and the comparative image processing mode indicated by the information included in the received read instruction signal and generates the read image and the comparative read image by executing the image processing of the identified image processing mode and comparative image processing mode on the input image respectively. Consequently, the information processing apparatus 200 can acquire the read image and the comparative read image in a shorter period. Further, since the number of times the user sets a medium in the loading tray 103 is one, the information processing apparatus 200 can improve user convenience.

Next, the second detection module 222 detects change regions different from each other in the read image and the comparative read image acquired by the second acquisition module 224 (step S11). The second detection module 222 compares the read image with the comparative read image and detects the change regions, similarly to the process in step S105.

Next, the second display control module 221 displays the read image and the comparative read image acquired by the second acquisition module 224 side by side on the display device 201 (step S112). Further, the second display control module 221 distinguishably displays the change region detected by the second detection module 222 in the read image or the comparative read image.

Figure 12:
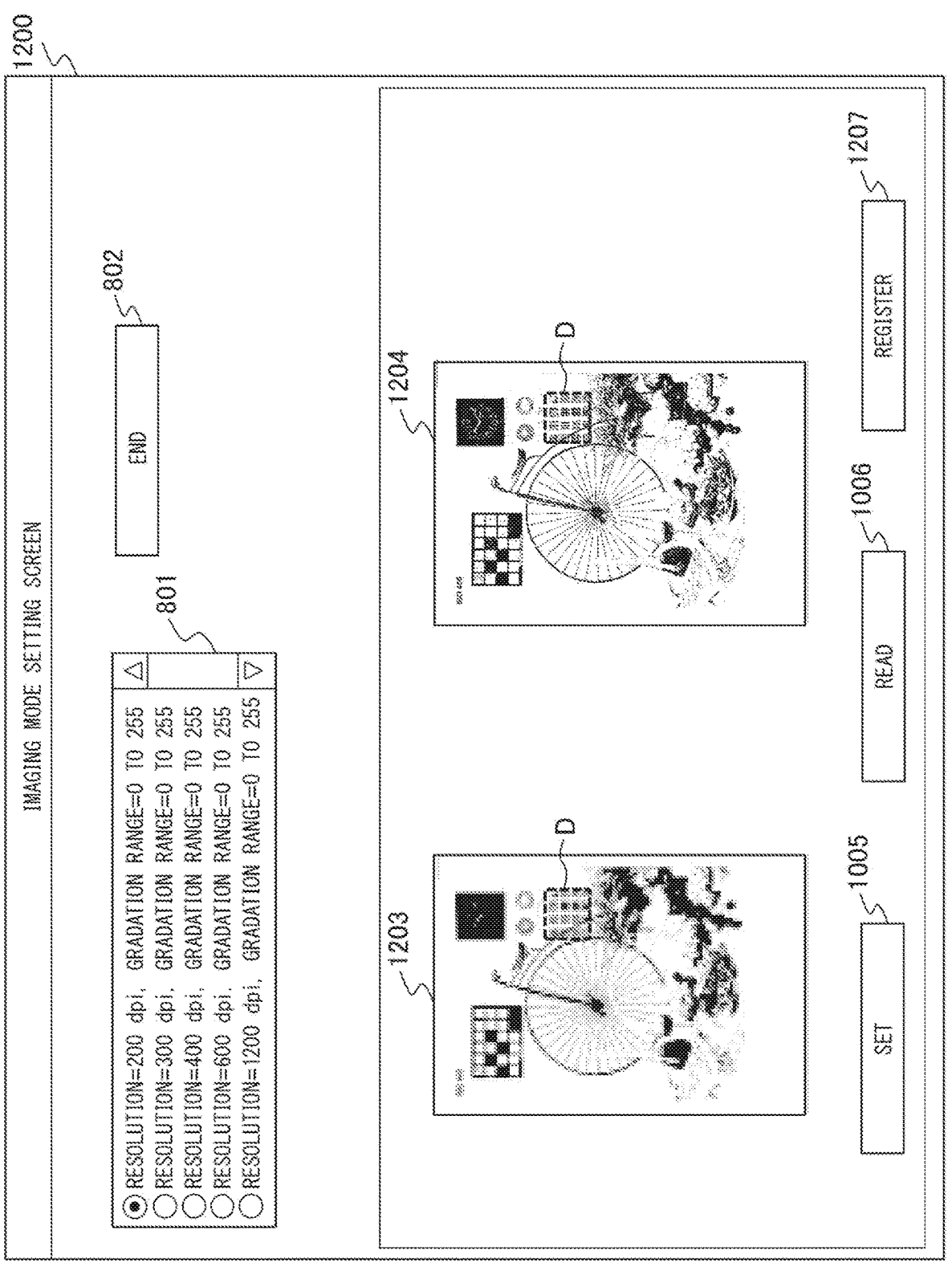
FIG. 12 is a schematic diagram illustrating an example of an imaging mode setting screen.

FIG. 12 is a schematic diagram illustrating an example of an imaging mode setting screen on which the read image and the comparative read image are displayed.

As illustrated in FIG. 12, the imaging mode setting screen 1200 includes a read image 1203 and a comparative read image 1204 in place of the sample image 1003 and the comparative sample image 1004. Further, the imaging mode setting screen 1200 includes a REGISTER button 1207 in addition to the selection region 801, the END button 802, the SET button 1005, and the READ button 1006. The read image 1203 is an image of a medium newly imaged by the image reading apparatus 100 with the imaging mode specified in the selection region 801. The comparative read image 1204 is an image of the medium newly imaged by the image reading apparatus 100 with the comparative imaging mode corresponding to the imaging mode specified in the selection region 801. Regions D surrounded by dotted lines in the read image 1203 and the comparative read image 1204 are the change regions detected by the second detection module 222.

The REGISTER button 1207 is a button for registering the read image 1203 and the comparative read image 1204 into the imaging mode table as the sample image and the comparative sample image related to the imaging mode specified in the selection region 801.

Figure 13:
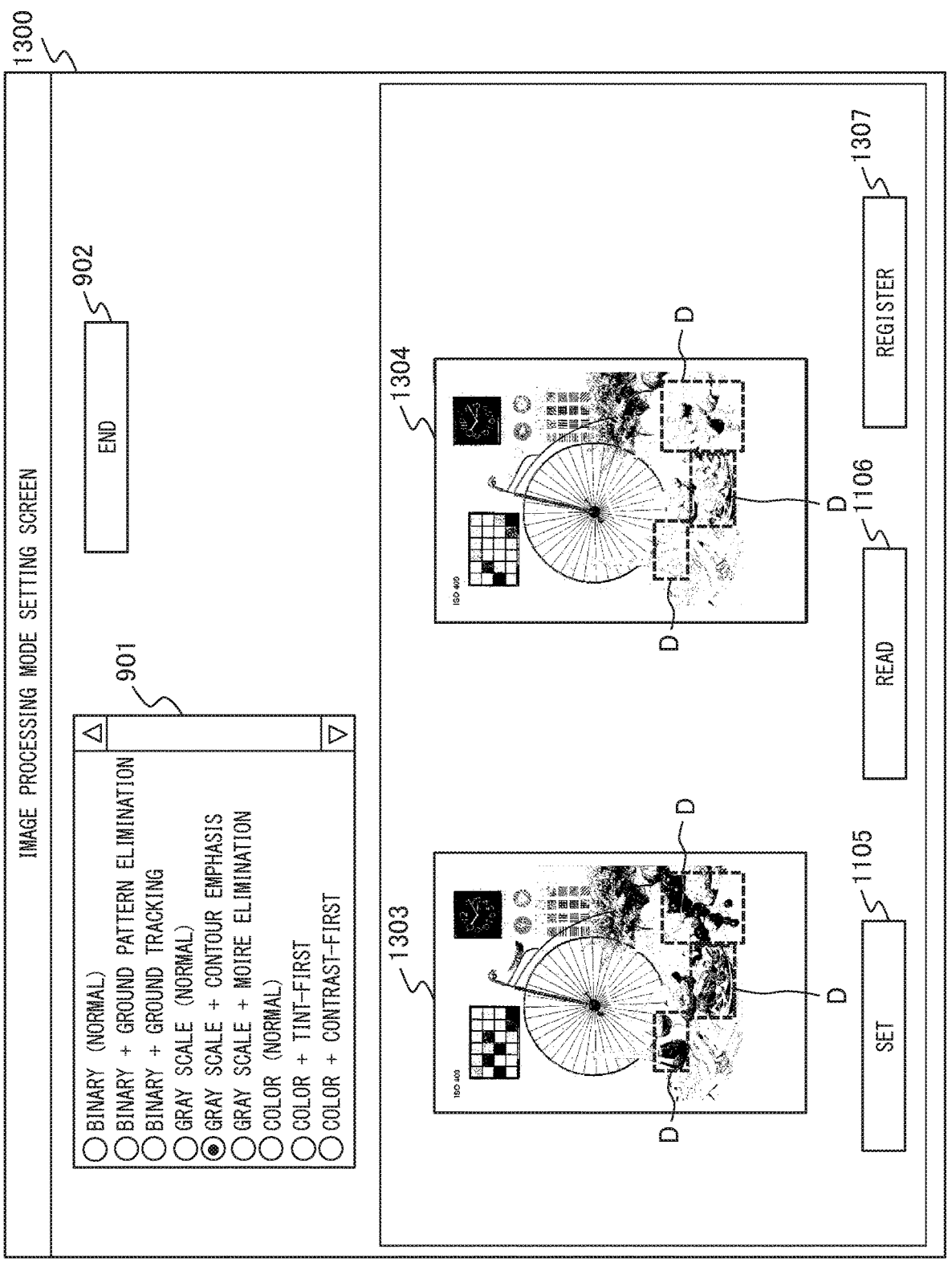
FIG. 13 is a schematic diagram illustrating an example of an image processing mode setting screen.

FIG. 13 is a schematic diagram illustrating an example of an image processing mode setting screen on which the read image and the comparative read image are displayed.

As illustrated in FIG. 13, the image processing mode setting screen 1300 includes a read image 1303 and a comparative read image 1304 in place of the sample image 1103 and the comparative sample image 1104. Further, the image processing mode setting screen 1300 includes a REGISTER button 1307 in addition to the selection region 901, the END button 902, the SET button 1105, and the READ button 1106. The read image 1303 is an image acquired by executing the image processing of the image processing mode specified in the selection region 901 on an image of a medium newly imaged by the image reading apparatus 100. The comparative read image 1304 is an image acquired by executing the image processing of the comparative image processing mode corresponding to the image processing mode specified in the selection region 901 on the image of the medium newly imaged by the image reading apparatus 100. Regions D surrounded by dotted lines in the read image 1303 and the comparative read image 1304 are the change regions detected by the second detection module 222.

The REGISTER button 1307 is a button for registering the read image 1303 and the comparative read image 1304 into the image processing mode table as the sample image and the comparative sample image corresponding to the image processing mode specified in the selection region 901.

As illustrated in FIG. 12 and FIG. 13, by displaying the read image and the comparative read image side by side, a user can recognize an effect of a specified imaging mode or image processing mode on an image of a medium used by the user. Accordingly, the image reading apparatus 100 can improve usability when the user sets an imaging mode or an image processing mode.

Next, the second display control module 221 determines whether or not a registration instruction is accepted from the user (step S113). When the REGISTER button in each setting screen is pressed by the user through the operation device 202, the second display control module 221 accepts the registration instruction from the user. When not accepting the registration instruction from the user, the second display control module 221 moves the process to step S115.

On the other hand, when the second display control module 221 accepts the registration instruction from the user, the second registration module 225 registers the read image and the comparative read image acquired by the second acquisition module 224 into the second storage device 210 (step S114). The second registration module 225 identifies an imaging mode or an image processing mode specified in the selection region in each setting screen as an imaging mode or an image processing mode specified by the user when the REGISTER button in the setting screen is pressed. When the imaging mode is specified by the user, the second setting module 223 registers the read image and the comparative read image into the imaging mode table as the sample image and the comparative sample image corresponding to the imaging mode specified by the user. On the other hand, when the image processing mode is specified by the user, the second setting module 223 registers the read image and the comparative read image into the image processing mode table as the sample image and the comparative sample image corresponding to the image processing mode specified by the user.

Consequently, thereafter, when specifying an imaging mode or an image processing mode corresponding to the registered read image, the user can recognize an effect of the specified imaging mode or image processing mode on a medium used by the user without newly imaging the medium again. Accordingly, the image reading apparatus 100 can improve usability and user convenience when the user sets an imaging mode or an image processing mode.

Next, the second display control module 221 determines whether or not an end instruction is accepted from the user (step S115). When the END button in each setting screen is pressed by the user through the operation device 202, the second display control module 221 accepts the end instruction from the user. When not accepting the end instruction from the user, the second display control module 221 moves the process to step S103 and repeats the process in step S103 to S115. On the other hand, when accepting the end instruction from the user, the second display control module 221 ends the series of steps.

The process in steps S109 to S112 or steps S113 and S114 may be omitted.

Figure 14:
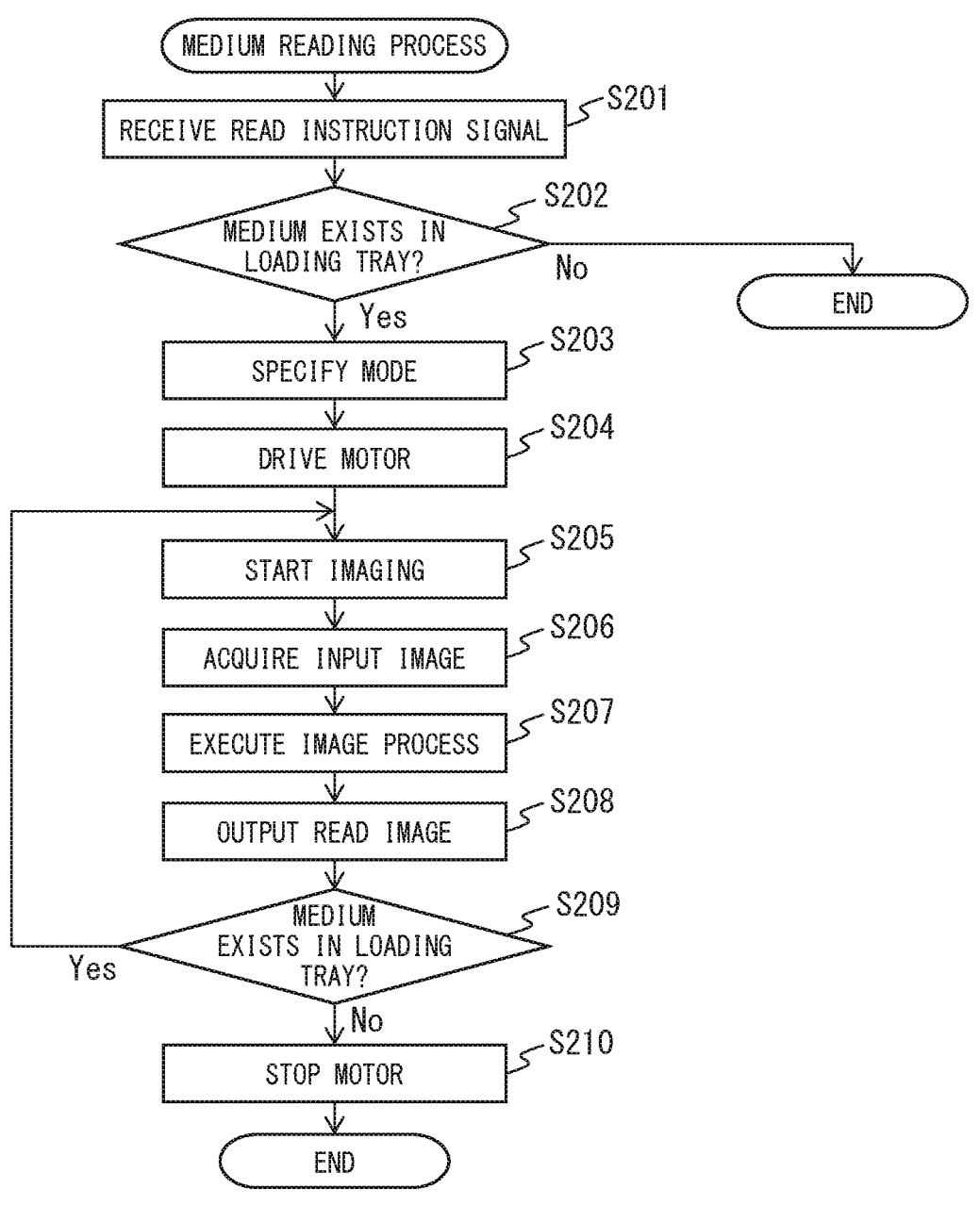
FIG. 14 is a flowchart illustrating an operation example of a medium reading process.

FIG. 14 is a flowchart illustrating an operation example of medium reading process in the image reading apparatus.

The operation example of the medium reading process in the image reading apparatus 100 will be described below referring to the flowchart illustrated in FIG. 14. The operation flow described below is executed mainly by the first processing circuit 140 in accordance with a program previously stored in the first storage device 130 in cooperation with the components in the image reading apparatus 100.

First, the control module 141 waits until an instruction to read a medium is input by a user through the display operation device 105 or the information processing apparatus 200 and a reading instruction signal is received from the display operation device 105 or the interface device 122 (step S201).

Next, the control module 141 acquires the medium signal from the medium sensor 111 and determines whether a medium is placed in the loading tray 103, based on the acquired first medium signal (step S202). When a medium is not placed in the loading tray 103, the control module 141 ends the series of steps. When a medium is not placed in the loading tray 103, the control module 141 may notify the user of information prompting placement of a medium into the loading tray 103 by displaying the information on the display operation device 105 and wait until a medium is placed in the loading tray 103.

On the other hand, when a medium is placed in the loading tray 103, the control module 141 identifies an imaging mode and an image processing mode set by the user (step S203). The control module 141 reads the imaging mode and the image processing mode set as a profile from the first storage device 130 and identifies the imaging mode and the image processing mode. When the imaging mode or the image processing mode is included in the read instruction signal, the control module 141 identifies the imaging mode and the image processing mode in such a way as to give priority to the imaging mode or the image processing mode included in the read instruction signal.

Next, the control module 141 rotates the feed roller 112, the separation roller 113, the first conveyance roller 114, and the second conveyance roller 117 to convey the medium by driving the motor 121 (step S204). The control module 141 controls the rotation speed of the motor 121 in such a way that the medium is imaged according to a resolution specified by the identified imaging mode.

Next, the control module 141 causes the imaging device 116 to start imaging of the medium (step S205). The control module 141 controls the imaging device 116 in such a way that the medium is imaged according to the resolution specified by the identified imaging mode and an input image is generated according to a gradation range specified by the identified imaging mode. Thus, the control module 141 controls the imaging device 116 in the imaging mode set by the user.

Next, when conveyance of the medium is completed, the control module 141 acquires the input image from the imaging device 116 and stops the imaging by the imaging device 116 (step S206).

Next, the control module 141 executes the image processing on the acquired input image and generates the read image on which the image processing has been executed (step S207). The control module 141 generates the read image by executing the image processing of the specified image processing mode on the input image.

Next, the control module 141 outputs the generated read image by transmitting the image to the information processing apparatus 200 through the first communication device 122 (step S208). The information processing apparatus 200 receives the read image from the image reading apparatus 100 through the second communication device 203, stores the received read image into the second storage device 210, and, at the same time, displays the image on the display device 201.

Next, the control module 141 determines whether a medium remains in the loading tray 103, based on the medium signal received from the medium sensor 111 (step S209). When a medium remains in the loading tray 103, the control module 141 returns the process to step S205 and repeats the process in steps S205 to S209.

On the other hand, when a medium does not remain in the loading tray 103, the control module 141 controls the motor 121 to stop the feed roller 112, the separation roller 113, the first conveyance roller 114, and the second conveyance roller 117 (step S210) and ends the series of steps.

When the read instruction signal is transmitted in step S110 in FIG. 7, the image reading apparatus 100 executes the image reading process twice in order to generate the read image and the comparative read image.

In the image processing system 1, only one of the imaging mode and the image processing mode may be user-settable, and the other may be set in a fixed manner. In that case, the information processing apparatus 200 displays the sample image and the comparative sample image side by side only for the user-settable mode.

As described in detail above, the information processing apparatus 200 sets the comparative imaging mode for each imaging mode set by a profile and displays an image of a medium imaged with an imaging mode specified by a user and an image of the medium imaged with the comparative imaging mode corresponding to the imaging mode side by side. Alternatively, the information processing apparatus 200 displays an image on which the image processing of an image processing mode specified by the user is executed and an image on which the image processing of the comparative image processing mode corresponding to the image processing mode is executed side by side. Consequently, the user can intuitively recognize a feature and an effect of an image imaged with each imaging mode or processed in each image processing mode and can set a more suitable imaging mode and image processing mode. Accordingly, the information processing apparatus 200 can improve usability when the user sets an imaging mode or an image processing mode.

In particular, by comparing an image imaged with a specified imaging mode or processed in a specified image processing mode with an image imaged with an imaging mode different from the specified imaging mode or processed in an image processing mode different from the specified image processing mode and being exclusively used, the user can precisely recognize a feature and an effect of the imaging mode and the image processing mode.

In recent years, diversification of imaging modes and image processing modes is under way through improvement in imaging technology and image processing technology, and it is difficult for a user unfamiliar with a scanner to correctly understand features and effects of various imaging modes and image processing modes. The information processing apparatus 200 displays images imaged with two imaging mode or processed in two image processing modes side by side. Therefore, even a user unfamiliar with a scanner can intuitively understand a feature and an effect of each imaging mode or image processing mode. Therefore, the user can select a suitable imaging mode or image processing mode based on the purpose of the user or the type of imaging target medium from among various imaging modes and image processing modes.

Figure 15:
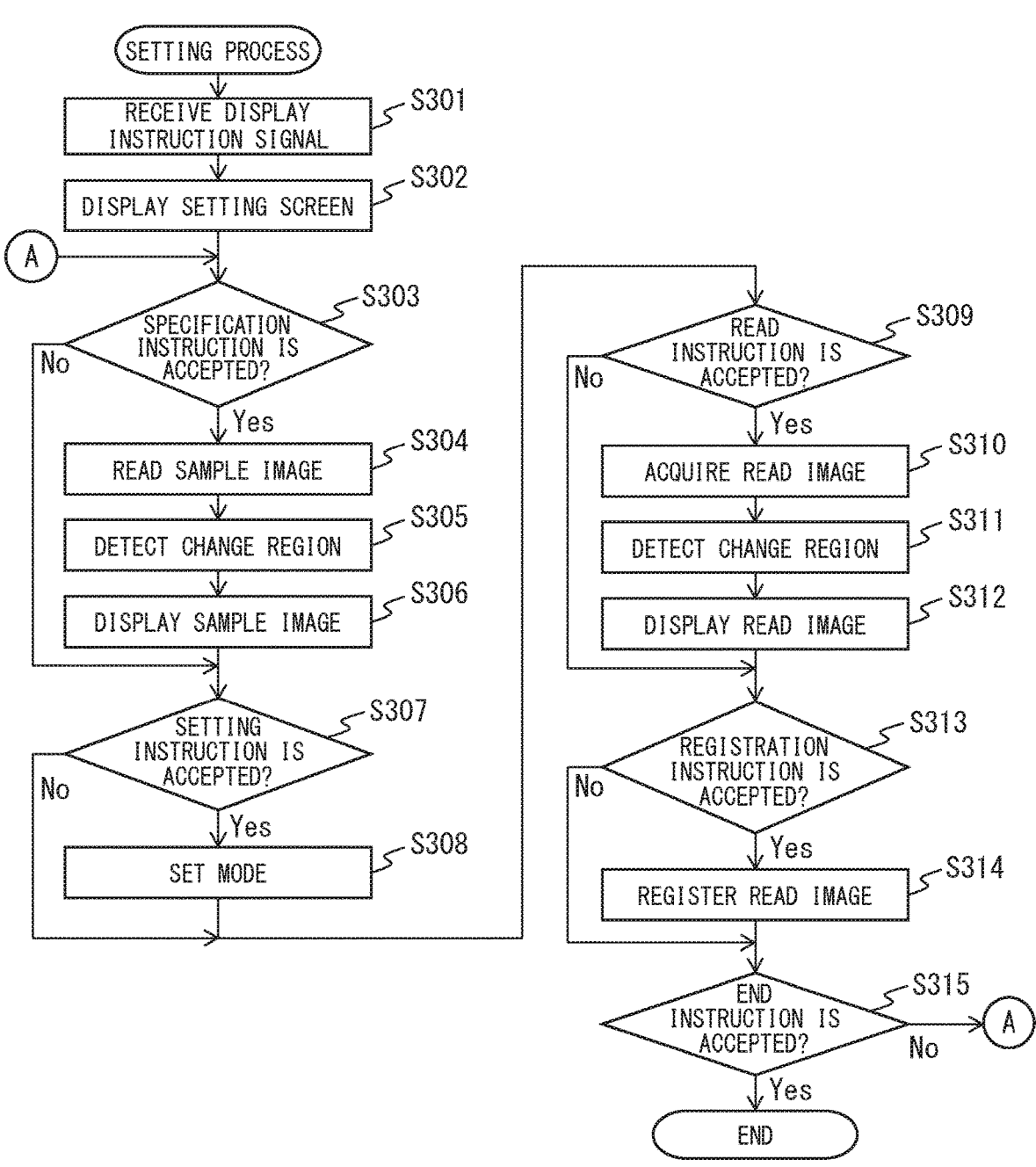
FIG. 15 is a flowchart illustrating an operation example of another type of the setting process.

FIG. 15 is a flowchart illustrating an operation example of setting process in an image processing system according to another embodiment.

The flowchart illustrated in FIG. 15 is executed in place of the flowchart illustrated in FIG. 7. The setting process according to the present embodiment is executed by an image reading apparatus 100 instead of the information processing apparatus 200. In other words, the image reading apparatus functions as an information processing apparatus, the first storage device 130 functions as a storage, the first communication device 122 functions as a communication device, and the display operation device 105 functions as the display, according to the present embodiment. Further, the first display control module 142, the first detection module 143, the first setting module 144, the first acquisition module 145, and the first registration module 146 function as a display control module, a detection module, a setting module, an acquisition module, and a registration module, respectively. Further, the imaging mode table and the image processing mode table are stored in the first storage device 130.

An operation example of the setting process in the image reading apparatus 100 will be described below referring to the flowchart illustrated in FIG. 15. The flow of the operation described below is executed mainly by the first processing circuit 140 in cooperation with the components in the image reading apparatus 100 in accordance with a program stored in advance in the first storage device 130.

Process in each of steps S301 to S315 in the flowchart illustrated in FIG. 15 is process similar to the process in each of steps S101 to S115 in the flowchart illustrated in FIG. 7. However, process executed by the second display control module 221, the second detection module 222, the second setting module 223, the second acquisition module 224, and the second registration module 225 are executed by the first display control module 142, the first detection module 143, the first setting module 144, the first acquisition module 145, and the first registration module 146, respectively. Further, a screen displayed on the display device 201 is displayed on the display operation device 105, and information input through the operation device 202 is input through the display operation device 105. Further, information read from the second storage device 210 is read from the first storage device 130, and information stored in the second storage device 210 is stored in the first storage device 130.

In step S308, the first setting module 144 sets the imaging mode or the image processing mode set by the user as a profile by storing the imaging mode or the image processing mode into the first storage device 130.

In step S310, the first acquisition module 145 acquires the read image and the comparative read image from the control module 141.

When an imaging mode is specified by the user, the control module 141 conveys a medium newly placed in the loading tray 103 by the user, images the medium by the imaging device 116 with the imaging mode specified by the user, and acquires the generated input image as the read image. On the other hand, when an image processing mode is specified by the user, the control module 141 conveys the medium newly placed in the loading tray 103 by the user, images the medium by the imaging device 116, and acquires a generated input image. The control module 141 generates the read image by executing image processing of the image processing mode specified by the user on the acquired input image. Further, the control module 141 generates the comparative read image similarly to generation of the read image.

As described in detail above, the image reading apparatus 100 can improve usability when a user sets an imaging mode or an image processing mode, when the image reading apparatus 100 executes the setting process as well.

Figure 16:
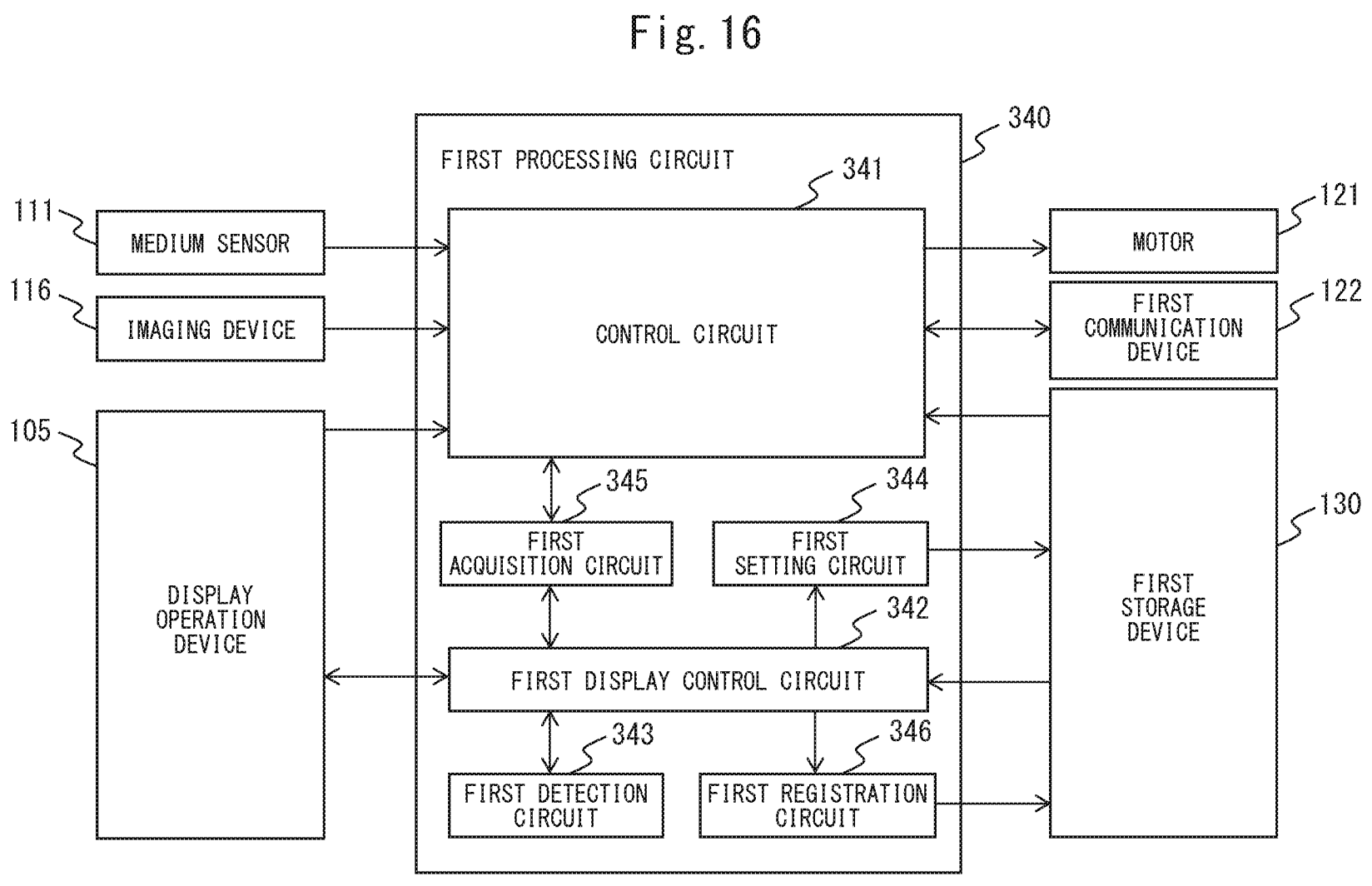

FIG. 16 is a diagram illustrating a schematic configuration of a first processing circuit in an image reading apparatus according to yet another embodiment. The first processing circuit 340 is used in place of the first processing circuit 140 in the image reading apparatus 100 and executes the medium reading process, the setting process, etc., in place of the first processing circuit 140. The first processing circuit 340 includes a control circuit 341, a first display control circuit 342, a first detection circuit 343, a first setting circuit 344, a first acquisition circuit 345, a first registration circuit 346, etc. For example, each component may be independently configured with an integrated circuit, a microprocessor, or firmware.

The control circuit 341 is an example of a control module and has a function similar to that of the control module 141. The control circuit 341 receives information indicating an imaging mode or an image processing mode set by a user from an information processing apparatus through the first communication device 122 and sets the imaging mode or the image processing mode to the first storage device 130. The control circuit 341 receives the read instruction signal from the display operation device 105 or the first communication device 122 and the medium signal from the medium sensor 111, reads each imaging mode or image processing mode from the first storage device 130, and controls the motor 121, based on the acquired information. Further, the control circuit 341 acquires the input image by controlling the imaging device 116 according to the read imaging mode or image processing mode, generates the read image, based on the input image, and outputs the generated read image to the first communication device 122.

The first display control circuit 342 is an example of a first display control module and has a function similar to that of the first display control module 142. The first display control circuit 342 displays the setting screen on the display operation device 105 and accepts various types of instructions from a user through the display operation device 105. The first display control circuit 342 reads the sample image and the comparative sample image from the first storage device 130, outputs the images to the first detection circuit 343, and receives a detection result of the change region from the first detection circuit 343. The first display control circuit 342 outputs information indicating the imaging mode or the image processing mode set by the user to the first setting circuit 344. The first display control circuit 342 outputs information indicating the imaging mode or the image processing mode set by the user and a comparative imaging mode or a comparative image processing mode to the first acquisition circuit 345 and receives the read image and the comparative read image from the first acquisition circuit 345. The first display control circuit 342 outputs the read image and the comparative read image that are registered by the user to the first registration circuit 346.

The first detection circuit 343 is an example of a first detection module and has a function similar to that of the first detection module 143. The first detection circuit 343 receives the sample image and the comparative sample image from the first display control circuit 342, detects the change region, and outputs the detection result to the first display control circuit 342.

The first setting circuit 344 is an example of a first setting module and has a function similar to that of the first setting module 144. The first setting circuit 344 receives information indicating the imaging mode or the image processing mode set by a user from the first display control circuit 342 and registers the imaging mode or the image processing mode into the first storage device 130.

The first acquisition circuit 345 is an example of a first acquisition module and has a function similar to that of the first acquisition module 145. The first acquisition circuit 345 receives information indicating the imaging mode or the image processing mode set by a user and the comparative imaging mode or the comparative image processing mode from the first display control circuit 342 and outputs the imaging modes or image processing modes to the control circuit 341. The first acquisition circuit 345 receives the read image and the comparative read image from the control circuit 341 and outputs the images to the first display control circuit 342.

The first registration circuit 346 is an example of a first registration module and has a function similar to that of the first registration module 146. The first registration circuit 346 receives the read image and the comparative read image that are registered by a user from the first display control circuit 342 and registers the images into the first storage device 130.

As described in detail above, the image reading apparatus can improve usability when a user sets an imaging mode or an image processing mode, when the first processing circuit 340 is used as well.

Figure 17:
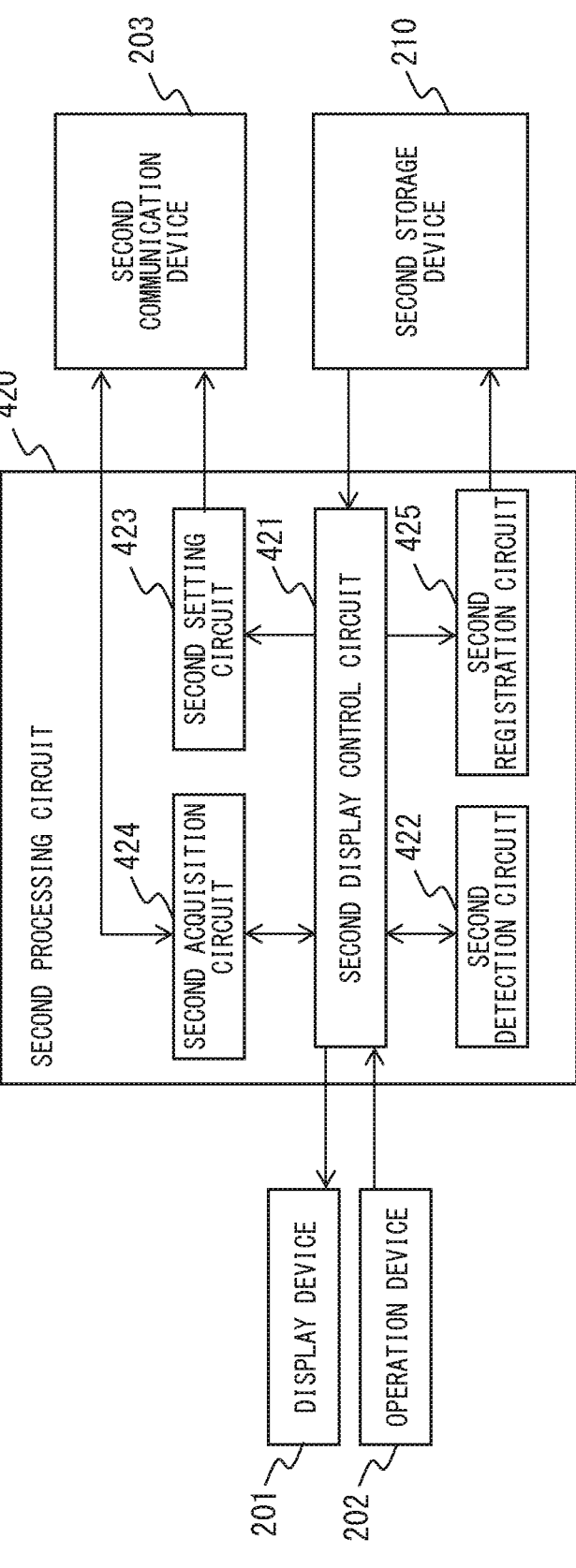
FIG. 17 is a diagram illustrating a schematic configuration of another second processing circuit.

FIG. 17 is a diagram illustrating a schematic configuration of a second processing circuit in an image reading apparatus according to yet another embodiment. The second processing circuit 420 is used in place of the second processing circuit 220 in the information processing apparatus 200 and executes the setting process etc., in place of the second processing circuit 220. The second processing circuit 420 includes a second display control circuit 421, a second detection circuit 422, a second setting circuit 423, a second acquisition circuit 424, a second registration circuit 425, etc. For example, each component may be independently configured with an integrated circuit, a microprocessor, or firmware.

The second display control circuit 421 is an example of a second display control module and has a function similar to that of the second display control module 221. The second display control circuit 421 displays the setting screen on a display device 201 and accepts various types of instructions from a user through an operation device 202. The second display control circuit 421 reads the sample image and the comparative sample image from the second storage device 210, outputs the images to the second detection circuit 422, and receives a detection result of the change region from the second detection circuit 422. The second display control circuit 421 outputs information indicating the imaging mode or the image processing mode set by the user to the second setting circuit 423. The second display control circuit 421 outputs information indicating the imaging mode or the image processing mode set by the user and the comparative imaging mode or the comparative image processing mode to the second acquisition circuit 424 and receives the read image and the comparative read image from the second acquisition circuit 424. The second display control circuit 421 outputs the read image and the comparative read image that are registered by the user to the second registration circuit 425.

The second detection circuit 422 is an example of a second detection module and has a function similar to that of the second detection module 222. The second detection circuit 422 receives the sample image and the comparative sample image from the second display control circuit 421, detects the change region, and outputs the detection result to the second display control circuit 421.

The second setting circuit 423 is an example of a second setting module and has a function similar to that of the second setting module 223. The second setting circuit 423 receives information indicating the imaging mode or the image processing mode set by a user from the second display control circuit 421 and transmits the imaging mode or the image processing mode to the image reading apparatus through a second communication device 203.

The second acquisition circuit 424 is an example of a second acquisition module and has a function similar to that of the second acquisition module 224. The second acquisition circuit 424 receives information indicating the imaging mode or the image processing mode set by a user and the comparative imaging mode or the comparative image processing mode from the second display control circuit 421 and transmits the imaging modes or the image processing modes to the image reading apparatus through the second communication device 203. The second acquisition circuit 424 receives the read image and the comparative read image from the image reading apparatus through the second communication device 203 and outputs the images to the second display control circuit 421.

The second registration circuit 425 is an example of a second registration module and has a function similar to that of the second registration module 225. The second registration circuit 425 receives the read image and the comparative read image that are registered by a user through the second display control circuit 421 and registers the images into the second storage device 210.

As described in detail above, the information processing apparatus can improve usability when a user sets an imaging mode or an image processing mode, when the second processing circuit 420 is used as well.

REFERENCE SIGNS LIST

100 Image reading apparatus, 105 Display operation device, 116 Imaging device, 122 First communication device, 130 First storage device, 141 Control module, 142 First display control module, 143 First detection module, 144 First setting module, 145 First acquisition module, 146 First registration module, 200 Information processing apparatus, 201 Display device, 203 Second communication device, 210 Second storage device, 221 Second display control module, 222 Second detection module, 223 Second setting module, 224 Second acquisition module, 225 Second registration module

The invention claimed is:

1. An information processing apparatus comprising:
a storage where, for each of a plurality of imaging modes or image processing modes, a comparative imaging mode different from the imaging mode or a comparative image processing mode different from the image processing mode, a sample image being an image of a sample medium imaged with the imaging mode or an image of the sample medium acquired by executing an image processing of the image processing mode on an image of the sample medium, and a comparative sample image being an image of the sample medium imaged with the comparative imaging mode or an image of the sample medium acquired by executing an image processing of the comparative image processing mode on the image of the sample medium are stored in advance; and a display to display a sample image and a comparative sample image of an imaging mode or an image processing mode specified by a user side by side, wherein only one mode is set as the comparative imaging mode or the comparative image processing mode for the each of the plurality of imaging modes or image processing modes, and wherein the sample image and the comparative sample image of the imaging mode or the image processing mode specified by the user, displayed in the display, are stored before accepting specification of the imaging mode or the image processing mode by the user.

2. The information processing apparatus according to claim 1, further comprising:

a communication device to communicate with an image reading apparatus; and a processor to acquire, from the image reading apparatus through the communication device, a read image being an image of a medium imaged with the imaging mode specified by the user or an image of the medium acquired by executing an image processing of the image processing mode specified by the user on an image of the medium, and a comparative read image being an image of the medium imaged with the comparative imaging mode or an image of the medium acquired by executing an image processing of the comparative image processing mode on the image of the medium, wherein the display displays the read image and the comparative read image acquired by the processor side by side.

3. The information processing apparatus according to claim 2, wherein the processor registers the read image and the comparative read image acquired by the processor into the storage as the sample image and the comparative sample image of the imaging mode or the image processing mode specified by the user.

4. The information processing apparatus according to claim 1, further comprising:

an imaging device to generate an input image by imaging a medium; and a processor to acquire a read image being an image of a medium imaged by the imaging device with the imaging mode specified by the user or an image acquired by executing an image processing of the image processing mode specified by the user on the input image, and a comparative read image being an image of the medium imaged by the imaging module with the comparative imaging mode or an image acquired by executing an image processing of the comparative image processing mode on the input image, wherein the display displays the read image and the comparative read image acquired by the processor side by side.

5. The information processing apparatus according to claim 1, wherein a region that differs between the sample image and the comparative sample image is detected, and wherein the display distinguishably displays the region detected in the sample image or the comparative sample image.

6. The information processing apparatus according to claim 1, wherein the plurality of imaging modes or image processing modes include a setting related to resolution, gradation range, color, brightness, hue, chroma, or noise elimination of an image.

7. A control method, the method comprising:

storing, for each of a plurality of imaging modes or image processing modes, a comparative imaging mode different from the imaging mode or a comparative image processing mode different from the image processing mode, a sample image being an image of a sample medium imaged with the imaging mode or an image of the sample medium acquired by executing an image processing of the image processing mode on an image of the sample medium, and a comparative sample image being an image of the sample medium imaged with the comparative imaging mode or an image of the sample medium acquired by executing an image processing of the comparative image processing mode on the image of the sample medium in a storage in advance; and displaying a sample image and a comparative sample image of an imaging mode or an image processing mode specified by a user side by side on a display, wherein only one mode is set as the comparative imaging mode or the comparative image processing mode for the each of the plurality of imaging modes or image processing modes, and wherein the sample image and the comparative sample image of the imaging mode or the image processing mode specified by the user, displayed in the display, are stored before accepting specification of the imaging mode or the image processing mode by the user.

8. The method according to claim 7, further comprising acquiring, from the image reading apparatus through a communication device, a read image being an image of a medium imaged with the imaging mode specified by the user or an image of the medium acquired by executing an image processing of the image processing mode specified by the user on an image of the medium, and a comparative read image being an image of the medium imaged with the comparative imaging mode or an image of the medium acquired by executing an image processing of the comparative image processing mode on the image of the medium, wherein displaying the acquired read image and the acquired comparative read image side by side on the display.

9. The method according to claim 8, further comprising registering the acquired read image and the acquired comparative read image into the storage as the sample image and the comparative sample image of the imaging mode or the image processing mode specified by the user.

10. The method according to claim 7, further comprising acquiring a read image being an image of a medium imaged by an imaging device with the imaging mode specified by the user or an image of the medium acquired by executing an image processing of the image processing mode specified by the user on an input image inputted by the imaging device and a comparative read image being an image of the medium imaged by the imaging device with the comparative imaging mode or an image of the medium acquired by executing an image processing of the comparative image processing mode on the input image, wherein displaying the acquired read image and the acquired comparative read image side by side on the display.

11. The method according to claim 7, further comprising detecting a region that differs between the sample image and the comparative sample image, wherein distinguishably displaying the detected region in the sample image or the comparative sample image.

12. The method according to claim 7, wherein the plurality of imaging modes or image processing modes include a setting related to resolution, gradation range, color, brightness, hue, chroma, or noise elimination of an image.

13. A computer-readable, non-transitory medium storing executable instructions, the executable instructions comprising:

storing, for each of a plurality of imaging modes or image processing modes, a comparative imaging mode different from the imaging mode or a comparative image processing mode different from the image processing mode, a sample image being an image of a sample medium imaged with the imaging mode or an image of the sample medium acquired by executing an image processing of the image processing mode on an image of the sample medium, and a comparative sample image being an image of the sample medium imaged with the comparative imaging mode or an image of the sample medium acquired by executing an image processing of the comparative image processing mode on the image of the sample medium in a storage in advance;

displaying a sample image and a comparative sample image of an imaging mode or an image processing mode specified by a user side by side on a display, wherein only one mode is set as the comparative imaging mode or the comparative image processing mode for the each of the plurality of imaging modes or image processing modes, and wherein the sample image and the comparative sample image of the imaging mode or the image processing mode specified by the user, displayed in the display, are stored before accepting specification of the imaging mode or the image processing mode by the user.

14. The computer-readable, non-transitory medium according to claim 13, the instructions further comprise acquiring, from the image reading apparatus through a communication device, a read image being an image of a medium imaged with the imaging mode specified by the user or an image of the medium acquired by executing an image processing of the image processing mode specified by the user on an image of the medium, and a comparative read image being an image of the medium imaged with the comparative imaging mode or an image of the medium acquired by executing an image processing of the comparative image processing mode on the image of the medium, wherein displaying the acquired read image and the acquired comparative read image side by side on the display.

15. The computer-readable, non-transitory medium according to claim 14, the instructions further comprise registering the acquired read image and the acquired comparative read image into the storage as the sample image and the comparative sample image of the imaging mode or the image processing mode specified by the user.

16. The computer-readable, non-transitory medium according to claim 13, the instructions further comprise acquiring a read image being an image of a medium imaged by an imaging device with the imaging mode specified by the user or an image of the medium acquired by executing an image processing of the image processing mode specified by the user on an input image inputted by the imaging device, and a comparative read image being an image of the medium imaged by the imaging device with the comparative imaging mode or an image acquired by executing an image processing of the comparative image processing mode on the input image, wherein displaying the acquired read image and the acquired comparative read image side by side on the display.

17. The computer-readable, non-transitory medium according to claim 13, the instructions further comprise detecting a region that differs between the sample image and the comparative sample image, wherein distinguishably displaying the detected region in the sample image or the comparative sample image.

18. The computer-readable, non-transitory medium according to claim 13, wherein the plurality of modes include a setting related to resolution, gradation range, color, brightness, hue, chroma, or noise elimination of an image.

* * * * *